United States Patent
Schultz et al.

(10) Patent No.: US 10,655,039 B2
(45) Date of Patent: May 19, 2020

(54) LOWER GWP REFRIGERANT COMPOSITIONS

(71) Applicant: TRANE INTERNATIONAL INC., Davidson, NC (US)

(72) Inventors: Kenneth J. Schultz, Onalaska, WI (US); Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 11 days.

(21) Appl. No.: 15/859,159

(22) Filed: Dec. 29, 2017

(65) Prior Publication Data

US 2019/0203092 A1    Jul. 4, 2019

(51) Int. Cl.
*C09K 5/04* (2006.01)

(52) U.S. Cl.
CPC .............. *C09K 5/044* (2013.01); *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC ........ C09K 2205/126; C09K 2205/122; C09K 5/044
See application file for complete search history.

(56) References Cited

U.S. PATENT DOCUMENTS

| | | | |
|---|---|---|---|
| 9,175,201 B2 | 11/2015 | Singh et al. | |
| 2008/0157022 A1* | 7/2008 | Singh | C09K 5/045 252/68 |
| 2012/0187330 A1* | 7/2012 | Singh | C09K 5/045 252/68 |
| 2016/0320111 A1 | 11/2016 | Saikusa et al. | |
| 2016/0333243 A1 | 11/2016 | Fukushima et al. | |
| 2016/0333244 A1 | 11/2016 | Fukushima | |
| 2016/0347980 A1 | 12/2016 | Okamoto | |
| 2017/0121581 A1 | 5/2017 | Horiike et al. | |
| 2017/0137682 A1 | 5/2017 | Hulse et al. | |
| 2017/0146265 A1 | 5/2017 | Fujitaka et al. | |

FOREIGN PATENT DOCUMENTS

WO    2017/126447    7/2017

OTHER PUBLICATIONS

Extended European Search Report; European Patent Application No. 18213893.3; dated May 23, 2019 (6 pages).

\* cited by examiner

*Primary Examiner* — John R Hardee
(74) *Attorney, Agent, or Firm* — Hamre, Schumann, Mueller & Larson, P.C.

(57) ABSTRACT

A refrigerant composition for an HVACR system that includes R1123 refrigerant, R32 refrigerant, and $CF_3I$. The refrigerant composition having a capacity greater than 85% of a capacity of R410 or a capacity of R32. A method of making a refrigerant composition for a HVACR system is also disclosed. The method includes mixing an amount of R1123, an amount of R32, and an amount of $CF_3I$. A method of retrofitting a refrigerant composition that results in the refrigerant composition is disclosed.

12 Claims, 16 Drawing Sheets

LOWER GWP REFRIGERANT COMPOSITIONS

FIELD

The disclosure herein relates to refrigerant compositions, which can be used in, for example, refrigeration, air conditioning, and/or heat pump systems, which, for example, can be incorporated into a heating, ventilation, air conditioning, and refrigeration (HVACR) system or unit.

BACKGROUND

Concern about environmental impact (e.g., ozone depletion) and the approval of the Montreal Protocol have resulted in a movement to replace ozone depleting refrigerants such as chlorofluorocarbons (CFCs) and hydrochlorofluorocarbons (HCFCs). Refrigerants, such as hydrofluorocarbons (HFCs) refrigerants and hydrofluoroolefins (HFOs) refrigerants have been utilized as replacements for previous refrigerants containing CFCs and HFCs. However, there has been recent movement (e.g., the Kigali Amendment to the Montreal Protocol, the Paris Agreement, United States' Significant New Alternatives Policy ("SNAP")) to phase out refrigerants that have a high global warming potential (GWP) such as some HFCs.

BRIEF SUMMARY

Refrigerant compositions that have an increased capacity and a GWP lower than R410A and/or R32 and methods of making such compositions are described. Refrigerant compositions that perform similar to R410A are described. Refrigerant compositions that perform similar to R32 are described. Refrigerant compositions, methods of making refrigerant compositions, and methods of retrofitting refrigerant compositions for servicing, controlling flammability, decreasing GWP, improving performance, and/or improving safety of an HVACR system are described.

In an embodiment, a refrigerant composition includes R1123 refrigerant, R32 refrigerant, and CF3I. In an embodiment, the refrigerant composition has a capacity that is equal to or greater than 85% of a capacity of R410A refrigerant. In an embodiment, the refrigerant composition has a capacity that is equal to or greater than 85% of a capacity of R32.

In an embodiment, the refrigerant or aboutnt composition has a GWP of at or about or less than 300. In an embodiment, the refrigerant composition has a GWP of at or about or less than 150. In an embodiment, the refrigerant composition has a GWP of at or about 150 to at or about 300.

In an embodiment, the refrigerant composition is a non-flammable composition.

In an embodiment, the refrigerant composition has a temperature glide of at or about or less than 10° F.

In an embodiment, the refrigerant composition further includes R1234yf.

In an embodiment, a method of making a refrigerant composition for a HVACR system includes mixing an amount of R1123, an amount of R32, and an amount of $CF_3I$. In an embodiment, the refrigerant composition has a capacity that is at or about or greater than 85% of a capacity of R410A refrigerant. In an embodiment, the mixing includes an amount of R1234yf.

In an embodiment, the refrigerant composition has a GWP of at or about or less than 300. In an embodiment, the refrigerant composition has a GWP of at or about or less than 150.

In an embodiment, the refrigerant composition is a non-flammable composition.

In an embodiment, the refrigerant composition has a temperature glide of at or about or less than 10° F.

In an embodiment, a method of retrofitting a refrigerant composition for a HVACR system includes adding one or more of an amount of R1123 refrigerant, an amount of CF3I, and an amount of a R32 refrigerant. The resulting retrofitted refrigerant includes the R1123 refrigerant, the R32 refrigerant, and the $CF_3I$ refrigerant. In an embodiment, the refrigerant composition being retrofitted includes at least one of R32 or R1123. In an embodiment, the retrofitted refrigerant composition has a capacity that is at or about or greater than 85% of a capacity of R410A refrigerant. In an embodiment, the retrofitted refrigerant composition has a capacity that is at or about or greater than 85% of a capacity of R32.

In an embodiment, the refrigerant composition has a GWP of at or about or less than 300. In an embodiment, the refrigerant composition has a GWP of at or about or less than 150.

In an embodiment, the refrigerant composition is a non-flammable composition.

In an embodiment, the refrigerant composition has a temperature glide of at or about or less than 10° F.

BRIEF DESCRIPTION OF THE DRAWINGS

Both described and other features, aspects, and advantages of refrigerant compositions, methods of making refrigerant compositions, and methods of retrofitting a refrigerant composition in an HVACR will be better understood with reference to the following drawings.

DETAILED DESCRIPTION

Figure 1:
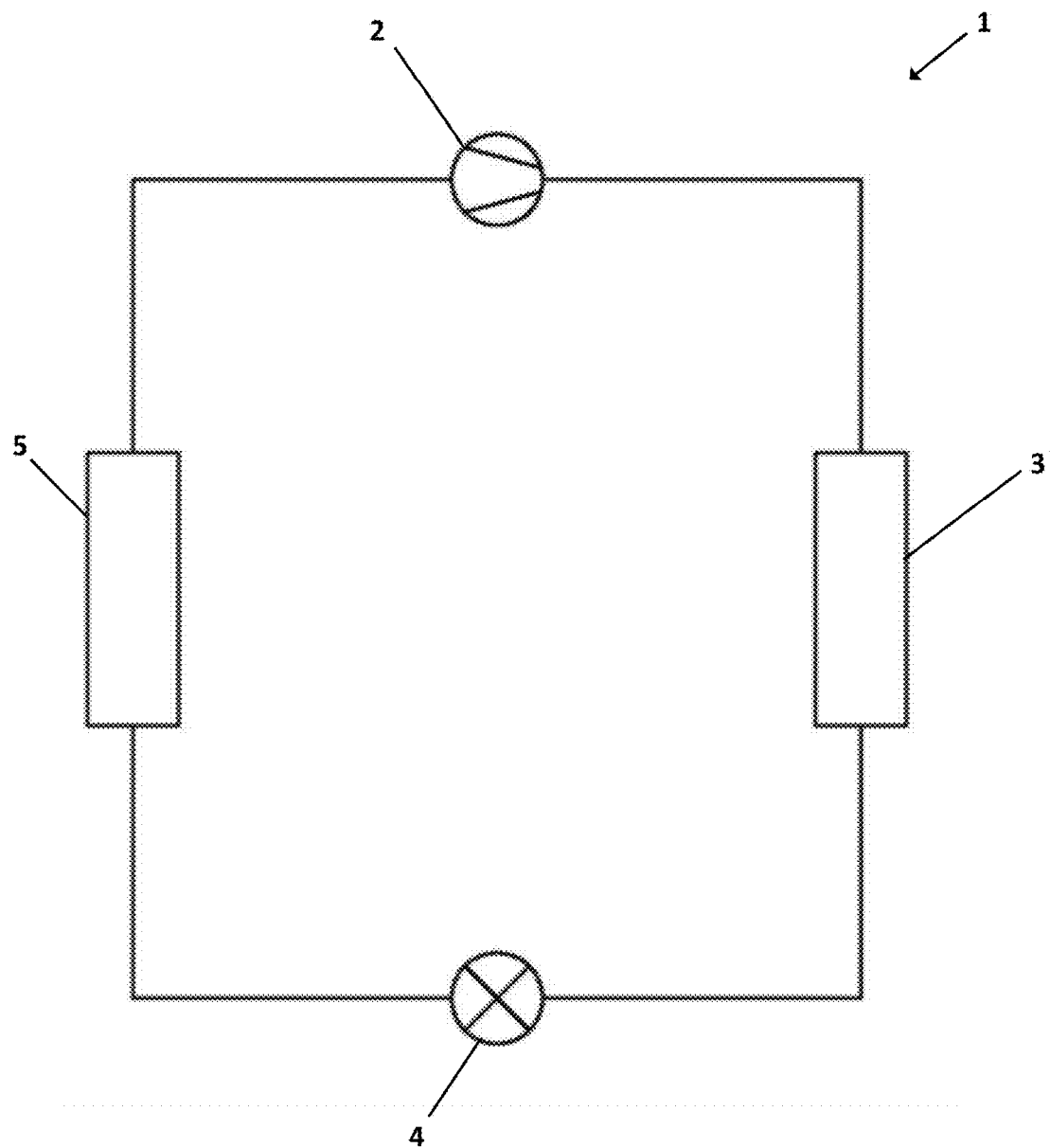
FIG. 1 illustrates a heat transfer circuit of a HVACR system in an embodiment.

Some refrigerant compositions described include R1123, R32, $CF_3I$ and are proposed as alternatives for R410A and/or R32 and as a refrigerant for HVACR systems designed for R410 and/or R32. Some refrigerant compositions described include R1123, R32, $CF_3I$, and R1234yf are proposed as alternatives for R410A and/or R32 and as a refrigerant for HVACR systems designed for R410 and/or R32.

R410A is a mixture of equal parts R32 and R125, has a high GWP of 1924, and is nonflammable (classified as A1 under ASHRAE Standard 34). R32 has a high GWP of 677 and is mildly flammable (classified as A2L under ASHRAE Standard 34). GWP described herein is based on the values reported in the Fifth Assessment Report of the Intergovernmental Panel on Climate Change ("AR5").

R1123 has a GWP of less than 1 and is mildly flammable (requested classification as A2L under ASHRAE Standard 34) with operating pressures similar to R32. However, R1123 has thermodynamic properties lower thermodynamic efficiency relative to R410A and R32. For example, R1123 has a capacity of approximately 102.6% relative to R32 and 110.6% relative to R410A, when utilized in normal air-conditioning operating condition (e.g., Tevap=50° F. with 15° F. suction superheat and Tcond=15° F. with 15° F. of exit liquid subcooling). The thermodynamic efficiency of R1123 is equal to 90.8% of R32 and 91.8% of R410A.

R1123, when used by itself as a working fluid in a HVACR system, can potentially undergo decomposition. Experimentation has shown that mixing the R1123 with another component, such as R32, can prevent this decomposition of R1123. R1123 and $CF_3I$ are likely to similarly prevent R1123 from undergoing decomposition when mixed with R1123 used as working fluid in an HVACR. R1123 may be used with other refrigerants to provide a refrigerant composition with a lower GWP.

$CF_3I$ is a fire suppressant with a low GWP (approximately 0.4 in AR5) and thermodynamic properties similar to R410A and R32. $CF_3I$ may be used to offset R1234yf in some refrigerant blends to produce a nonflammable mixture with a lower GWP.

Embodiments disclosed are directed to refrigerant compositions, and methods of retrofitting a refrigerant composition, and methods of making a refrigerant composition. In some embodiments, the refrigerant compositions or retrofitted refrigerant compositions have a capacity that is at or about or greater than 85% of the capacity of R410A and a GWP of at or about or less than 300. In some embodiments, the refrigerant compositions or retrofitted refrigerant compositions have a capacity that is at or about or greater than 85% of the capacity R410A, are nonflammable, and have a GWP of less than 300. In some embodiments, the refrigerant compositions or retrofitted refrigerant compositions have a capacity that is at or about or greater than 85% of the capacity R32 and a GWP of at or about or less than 300. In some embodiments, the refrigerant compositions or retrofitted refrigerant compositions have a capacity that is at or about or greater than 85% of the capacity R32, are nonflammable, and a GWP of at or about or less than 300.

A determination of flammability is based on ASHRAE Standard 34. Compositions described as non-flammable have a flammability that would result in their classification as a Class 1 refrigerant as determined under ASHRAE Standard 34.

In an embodiment, a refrigerant composition with a specific set of performance properties may be desired. In some embodiments, the refrigerant composition may be utilized in an HVACR designed for R410A. In such embodiments, it would be desired for the refrigerant composition or retrofitted composition to perform similar to R410A so that the HVACR system does not have to be modified. In some embodiments, the refrigerant composition may be utilized in an HVACR designed for R32. In such embodiments, it would be desired for the refrigerant composition or retrofitted composition to perform similar to R32 so that the HVACR system does not have to be modified.

Performance of a refrigerant may be based on one or more properties of the refrigerant composition. For example, properties that affect performance are capacity, temperature glide, coefficient of performance (thermodynamic efficiency), a compressor discharge temperature, mass flow rate, and a density of the refrigerant when in the liquid phase. In some embodiments, a composition with a capacity that is at or about or greater than 85% of the capacity of R410A may be desired. In some embodiments, a composition with a capacity that is at or about or greater than 85% of the capacity of R32 may be desired.

A HVACR system may be designed to utilize a specific refrigerant (e.g., R410A or R32). If the HVACR system is modified to utilize a working fluid that has a capacity less than 85%, it may result in, for example, requiring a compressor with a larger volumetric displacement, larger amounts of process fluid, and/or larger temperature differences that decrease the efficiency of the HVACR system. In some embodiments, a working fluid with a capacity that is at or about or greater than 90% of the capacity of the specific refrigerant (e.g., R410A or R32) may be desired. A working fluid with a capacity that has a capacity that is at or about or less than 10% from the specified refrigerant can result in, for example, a minimal impact on the efficiency of the HVACR system designed for the specific refrigerant. A working fluid with a capacity that is at or about or greater than 95% of the capacity of the specified refrigerant (e.g., R410A or R32) can result in, for example, an even lesser impact on the efficiency of the HVACR system designed for the specific refrigerant (e.g., R410A or R32). The performance properties may be relative to the performance properties of R410A or R32. In some embodiments, one or more properties of a refrigerant composition may be simulated and/or estimated by an Excel-based vapor compression thermodynamic cycle tool utilizing NIST's REFPROP program to compute thermodynamic properties.

An HVACR system can be used to cool or heat one or more conditioned spaces. A HVACR system may utilize a refrigerant in a circuit to cool a process fluid (e.g., air, water). For example, an HVACR system in some instances will cool an area by performing work on a refrigerant that is in a heat exchange relationship with air. The cooled air may then be ventilated to an area to cool the area.

FIG. 1 is a schematic diagram of a heat transfer circuit 1 of a HVACR system, according to an embodiment. The heat transfer circuit 1 includes a compressor 2, a condenser 3, an expansion device 4, and an evaporator 5. In an embodiment, the heat transfer circuit 1 can be modified to include additional components. For example, in an embodiment, the heat transfer circuit 1 can include an economizer heat exchanger, one or more flow control devices, a receiver tank, a dryer, a suction-liquid heat exchanger, or the like.

The components of the heat transfer circuit 1 are fluidly connected. The heat transfer circuit 1 can be configured as a cooling system (e.g., a fluid chiller of an HVACR, an air conditioning system, and the like) that can be operated in a cooling mode, and/or the heat transfer circuit 1 can be configured to operate as a heat pump system that can run in a cooling mode and a heating mode.

The heat transfer circuit 1 as described applies known principles of gas compression and heat transfer. The heat transfer circuit can be configured to heat or cool a process fluid (e.g., water, air). In an embodiment, the heat transfer circuit 1 may represent a chiller that cools a process fluid such as water or the like. In an embodiment, the heat transfer circuit 1 may represent an air conditioner and/or heat pump that includes a process fluid such as air or the like.

During the operation of the refrigerant circuit 1, a working fluid (e.g., refrigerant, refrigerant mixture) flows into the compressor 2 from the evaporator 5 at a relatively lower pressure in a gaseous state. The compressor 2 compresses the gas into a high pressure state, which also heats the gas. After being compressed, the relatively higher pressure and higher temperature gas flows from the compressor 2 to the condenser 3. In addition to the refrigerant flowing through the condenser 3, an external fluid (e.g., external air, external water, chiller water, and the like) also flows through the condenser 3. The external fluid absorbs the heat from the working fluid as it flows through the condenser 3. The working fluid condenses to liquid and then flows into the expansion device 4. The expansion device 4 reduces the pressure of the working fluid. The reduced pressure allows the working fluid to expand and be converted to a mixed vapor and liquid state. The relatively lower temperature, vapor/liquid working fluid then flows into the evaporator 5. A process fluid (e.g., air, water, and the like) also flows through the evaporator 5. In accordance with known principles, the working fluid absorbs heat from the process fluid as it flows through the evaporator 5. As the working fluid absorbs heat, the working fluid evaporates to vapor. The working fluid then returns to the compressor 2. The above-described process continues while the heat transfer circuit 1 is operated, for example, in a cooling mode.

The refrigerant compositions and methods described herein may be used in the heat transfer circuit 1 of the HVACR system. For example, methods of retrofitting a refrigeration composition may be applied to the heat circuit 1 of FIG. 1. Further, refrigeration compositions described herein may be used as a working fluid in the heat transfer circuit 1 of FIG. 1. Additionally, methods for retrofitting a refrigerant composition described here may be carried out on the working fluid in the heat transfer circuit 1 of FIG. 1.

Figure 2:
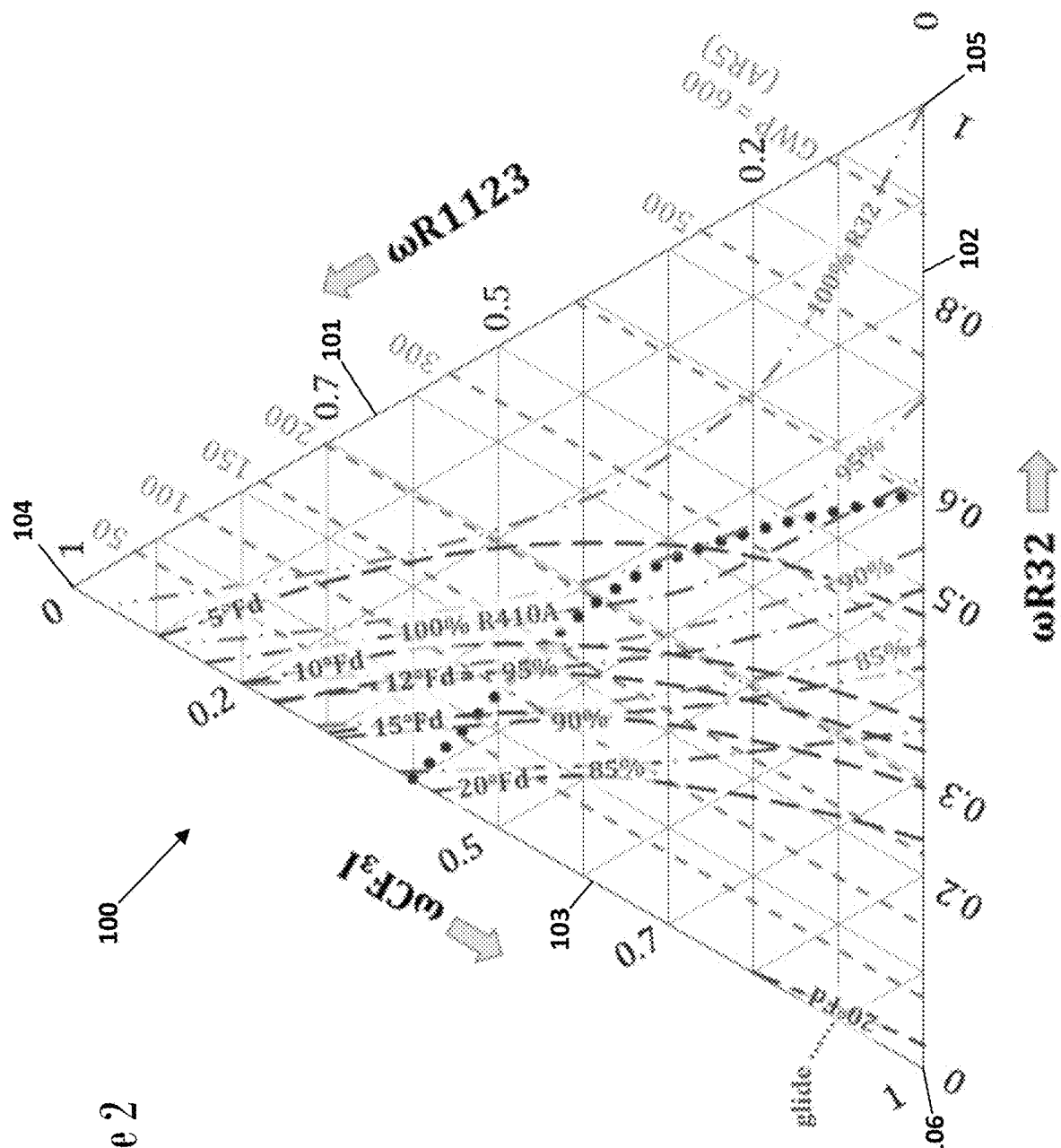
FIG. 2 illustrates a matrix of compositions of R1123, R32, and $CF_3I$ showing plots of GWP, flammability, temperature glide, capacity relative to R410A, and capacity relative to R32.

FIG. 2 illustrates a matrix 100 that was developed to show plots of GWP, flammability, temperature glide, capacity relative to R410A, and capacity relative to R32 as function of the concentration of R1123, R32, and $CF_3I$. Each side 101, 102, 103 of the triangle corresponds to weight percentages of R1123, R32, and $CF_3I$, respectively. Each vertex 104, 105, 106 corresponds to a composition of 100 wt % R1123, R32, and $CF_3I$, respectively. Properties (e.g., GWP, flammability, capacity relative to R410A or R32) of a refrigerant composition with a weight percent of R1123, R32, and $CF_3I$ can be estimated using the matrix 100.

Properties of the compositions for the matrix 100 were estimated using a thermodynamic model. The boundary between flammable and non-flammable compositions is shown by the dotted line extending from side 102 to side 103. Flammable compositions are on the right side of the boundary and non-flammable compositions are on the left side of the boundary. The boundary is based on the known flammability characteristics of R1123, R32, $CF_3I$, R410A, and the flame suppressant properties of $CF_3I$. GWP is based on the GWP of individual components and the method described in ASHRAE Standard 34 for calculating the GWP of refrigerant blends. The flammability boundary is estimated based on known characteristics of the individual components and various binary mixtures of the components. Accordingly, the amount of each refrigerant in a composition along the flammability boundary may, for example, vary by about 5 percent in an embodiment. It should be appreciated the compositions and ranges shown and/or described may be updated based on further testing to confirm the location of the flammability boundary.

Figure 3:
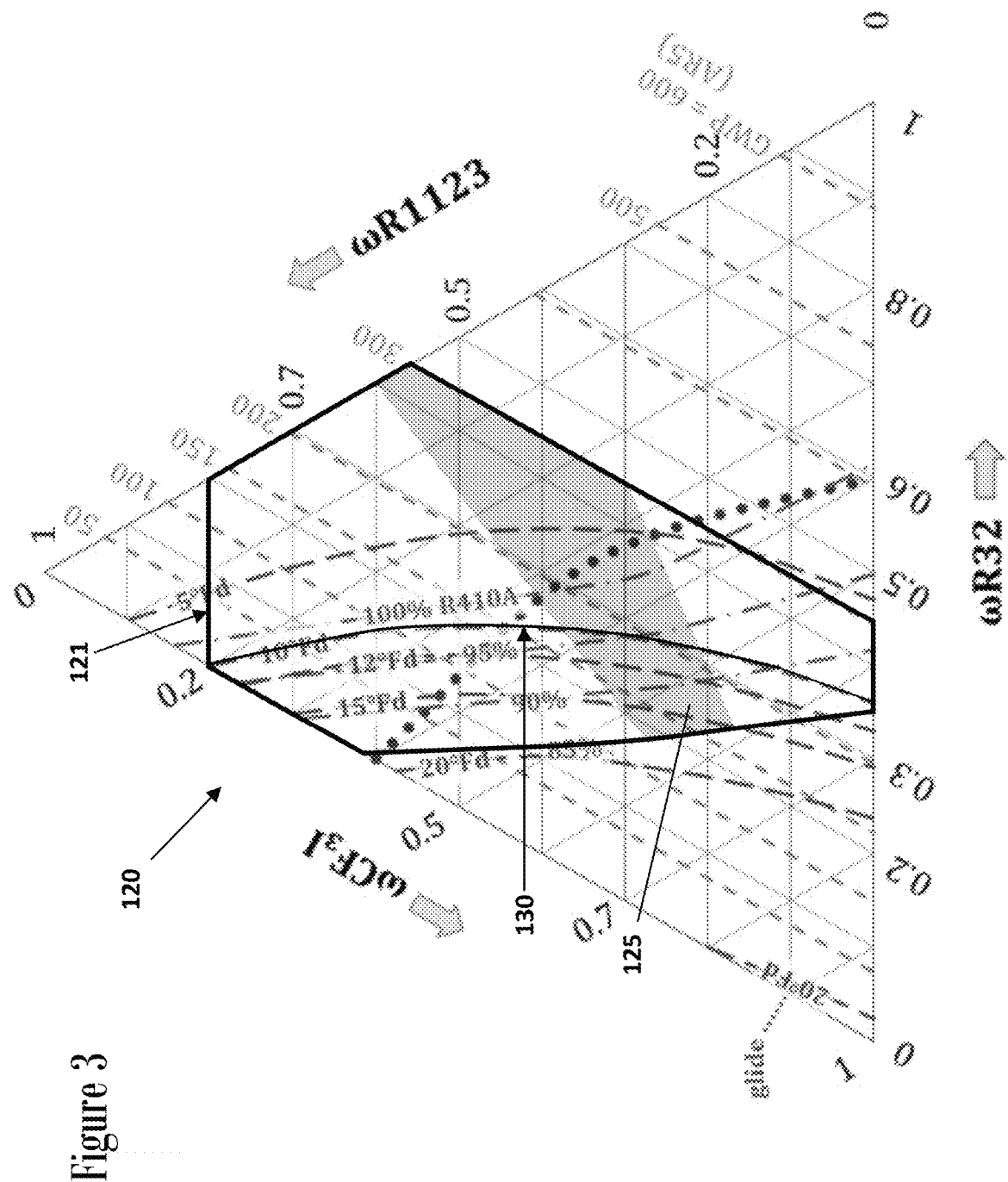
FIGS. 3-6 each illustrate a matrix based on the matrix of FIG. 2 that can be used to select a refrigerant composition with a desired set of properties in an embodiment.
Figure 4:
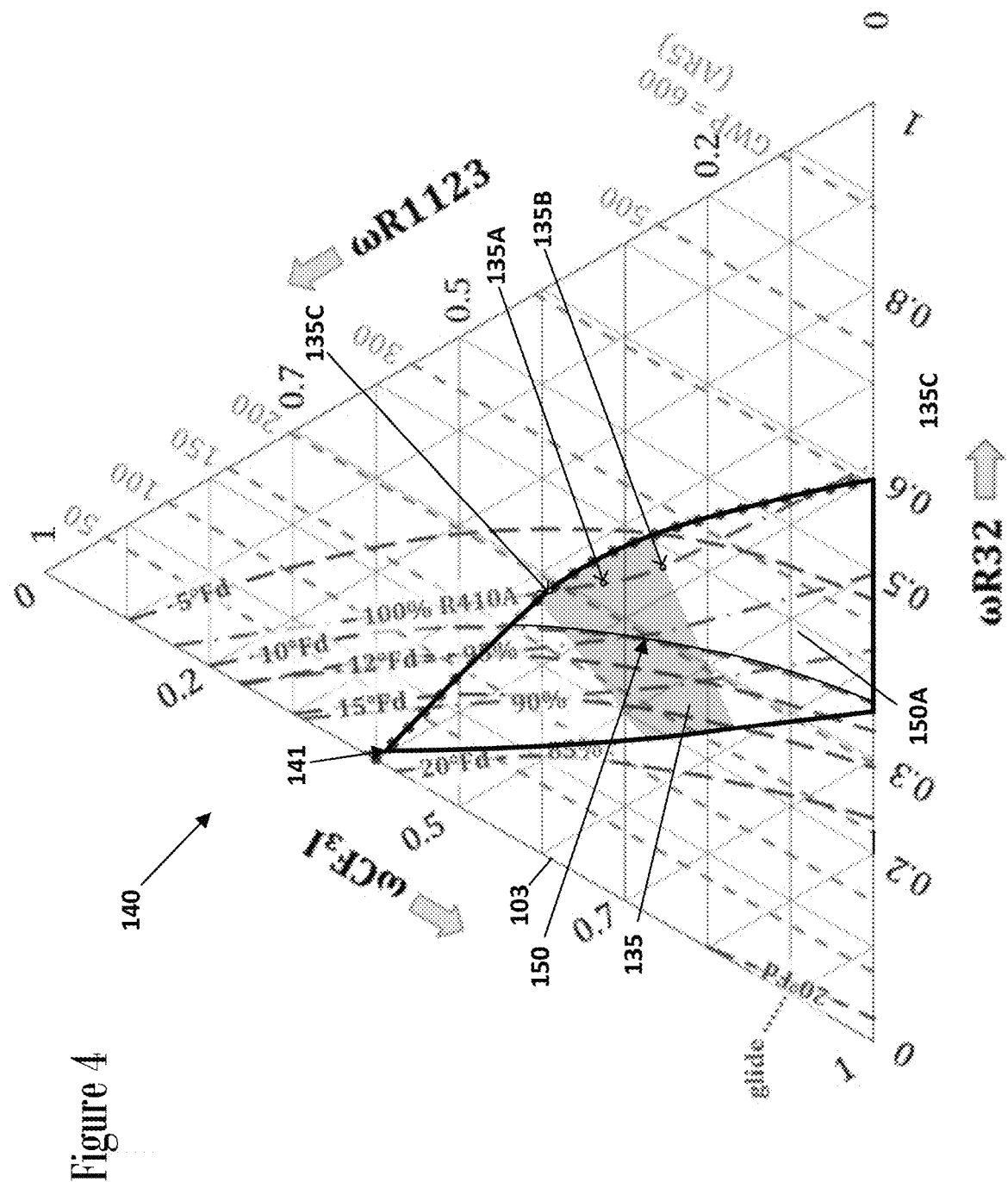

Each of FIGS. 3 and 4 illustrate a matrix 120, 140 based on matrix 100 of FIG. 2 and has the same sides and vertices as the matrix 100 of FIG. 2. Each matrix 120, 140 is the same as the matrix 100 of FIG. 2, except the matrices 120, 140 do not include capacities relative to R32 and illustrates ranges of refrigerant compositions. Each matrix 120, 140 can be used in a method of making a refrigerant composition of R1123, R32, and $CF_3I$ having one or more desired properties. As shown in FIG. 2, an increase in the weight percentage of R32 (shown by side 12) in a composition also increases the GWP of the composition.

In an embodiment, a desired set of properties of a useful refrigerant composition includes having a GWP of at or about or less than 300, having a capacity that is at or about or greater than 85% of the capacity of R410A. As discussed above, R1123 when used by itself as a working fluid decomposes. R1123 may be stable when mixed another refrigerant such as R32 or $CF_3I$ and mixture contains at about 80 wt % or less of the R1123. This is estimated based on the characteristics of R1123, $CF_3I$ and R32. Accordingly, this maximum for the amount of R1123 may be updated based on further testing.

Based on these desired properties, a range of useful refrigerant compositions 121 is shown in matrix 120 of FIG. 3. The useful refrigerants 121 include at or about 44 wt %, or less than 44 wt % and greater than 0 wt % of R32; at or about 80 wt %, or less than 80 wt % of R1123 and greater than 0 wt % of R1123; and at or about 65 wt %, or less than 65% and greater than 0 wt % of $CF_3I$.

In an embodiment, the useful compositions 121 may include preferred compositions 130 as shown in FIG. 3. The properties of the preferred compositions 130 are that they have a capacity at or about or greater than 85% of the capacity of R410A, a GWP at or about or less than 300, and a temperature glide at or about or less than 10° F. The preferred compositions 130 include at or about 44 wt %, or less than 44 wt % and greater than 0 wt % of R32; at or about 80 wt %, or less than 80 wt % of R1123 and greater than 0 wt % of R1123; and at or about 64 wt %, or less than 64% and greater than 0 wt % of $CF_3I$.

FIG. 3 also includes a shaded area 125. The compositions within the shaded area 125 have a ratio of R1123 to R32 (R1123:R32) by weight that is from at or about 60:40 to at or about 40:60. In an embodiment, compositions having a ratio of R1123 to R32 that is from about 60:40 to about 40:60 have high stability and similar thermodynamic properties as R410A as discussed below regarding FIGS. 7A-7D. In some embodiments, a set of desired properties may include the high stability and advantageous thermodynamic properties provided by compositions within the shaded area 125. In such embodiments, the useful compositions 121 and preferred compositions 130 shown in FIG. 3 would include those compositions that are also within the shaded area 125.

In an embodiment, the desired property of the GWP being equal or less than 300 may be different. In an embodiment, a composition having a GWP of at or about or less than 200 may be desired. In an embodiment, a composition having a GWP of at or about or less than 150 may be desired. In an embodiment, a composition having a GWP of at or about 150 to at or about 300 may be desired. In such embodiments, the useful compositions 121 and the preferred compositions 130 in FIG. 3 would include those compositions with the desired GWP.

In an embodiment, the desired property of the capacity being equal or greater than 85% of the capacity of R410A may be different. In an embodiment, a composition having a capacity at or about or greater than 90% of the capacity of R410A may be desired. In an embodiment, a composition having a capacity at or about or greater than 95% of the capacity of R410A may be desired. In an embodiment, a composition having a capacity at or about or greater than the capacity of R410A may be desired. In such embodiments, the useful compositions 121 and preferred compositions 130 shown in FIG. 3 would include the compositions with the desired capacity.

In an embodiment, a desired property of the temperature glide may be different than 10° F. In an embodiment, a composition having a temperature glide at or about or less than 15° F. may be desired. In an embodiment, a composition having a temperature glide at or about or less than 12° F. may be desired. In such embodiments, the useful compositions in FIG. 121 would include those compositions with the desired temperature glide. In an embodiment, a composition having a temperature glide at or about or less than 5° F. may be desired. In such an embodiment, the useful compositions 121 and the preferred compositions 130 in FIG. 3 would include those compositions with the desired temperature glide.

In an embodiment, a desired set of properties of a refrigerant composition includes being nonflammable and having a capacity that is at or about or greater than 85% of the capacity of R410A. Based on these desired properties, a range of useful refrigerant compositions 141 is shown in matrix 140 of FIG. 4. The useful refrigerant compositions 141 includes at or about 2% to at or about 60 wt % of R32; at or about 58 wt %, or less than 58 wt % of R1123 and greater than 0 wt % of R1123; and at or about 32 wt % to at or about 65% of $CF_3I$.

In an embodiment, the useful compositions 141 may include preferred compositions 150 as shown in FIG. 4. The properties of the preferred compositions 150 are that they are nonflammable, have a capacity greater than 85% of the capacity of R410A, and have a temperature glide at or about or less than 10° F. The preferred compositions 150 include at or about 22 wt % to at or about 60 wt % of R32; at or about 44 wt %, or less than 44 wt % of R1123 and greater than 0 wt % of R1123; and at or about 32 wt % to at or about 64 wt % of $CF_3I$. Of preferred compositions 150, compositions 150A may be desired in an embodiment as they have a GWP of less than 300. Compositions 150A is an example of a particular range of compositions that may be desired depending upon the set of desired properties.

FIG. 4 also includes a shaded area 135. The compositions within the shaded area 125 have a ratio of R1123 to R32 (R1123:R32) by weight that is from at or about 60:40 to at or about 40:60. In an embodiment, compositions having a ratio of R1123 to R32 from about 60:40 to about 40:60 have high stability and similar thermodynamic properties relative to R410A as discussed below regarding FIGS. 7A-7D. In some embodiments, a set of desired properties may include high stability and one or more of the advantageous thermodynamic properties provided by compositions within the shaded area 125. In such embodiments, the useful compositions 141 and preferred compositions 150 shown in FIG. 4 would include those compositions that are also within the shaded area 135. Of the compositions within the shaded area 135, compositions 135A and 135B may be desired as they have thermodynamic properties similar to R410A. Composition 135A includes at or about 32.5 wt % of R1123, at or about 32.5 wt % R32, and at or about 35 wt % of $CF_3I$. Composition 135B includes at or about 40 wt % of R1123, at or about 38 wt % of R32, and at or about 37 wt % of $CF_3I$. Table 1 below shows various properties of compositions 135A-135B. Table 1 also includes the reference values used for R410A. In calculating thermodynamic properties, the assumption is that compressor volumetric displacement is constant. The increase in isentropic enthalpy may be used in specific types of compressors, such as centrifugal compressors. In an embodiment, one or more end points in the ranges of each component (R1123/R32/$CF_3I$) for compositions 135A-135C may be used as used an end point for a desired composition.

TABLE 1

Properties of R410A and Compositions 135A, 135B, 135C

|  | R410A | 135A | 135B | 135C |
|---|---|---|---|---|
| Capacity* | 0.912[1] | 100.0% | 99.9 | 100.3% |
| GWP | 1,924 | 221 | 258 | 190 |
| Coefficient of Performance* | 4.467 | 98.1% | .988 | 97.5% |
| Compressor Discharge Temperature* | 173.2° F. | +17.1° F. | +17.6 | +16.5° F. |
| Mass Flow Rate* | 162.0 | 112.4% | 110.0 | 114% |
| Density (Liquid)* | 58.4 $lb_m/ft^3$ | 1.119% | 112.6 | 111% |
| Temperature Glide (at compressor) | 0.2° F. | 7.2° F. | 6.1° F. | 7.9° F. |
| Compressor Pressure Ratio (Discharge Pressure:Suction Pressure)* | 2.58 | 100.7% | 100.2% | 101.1% |
| Isentropic Enthalpy Increase | 11.61 | 90.7% | 92.1% | 89.9% |
| Average Pressure in Condenser | 406.4 psia | 408.6 psia | 404.5 psia | 413.5 psia |
| Average Pressure in Evaporator | 157.5 psia | 157.3 psia | 156.5 psia | 158.6 psia |
| Temperature Critical Point | 160.4° F. | 173.5° F. | 176.7° F. | 170.1° F. |

*Property for Compositions 135A, 135B, and 135C are relative to R410A (100% being equal to R410A).
[1]Tons per CFM of compressor displacement (assumed to be fixed).

In an embodiment, set of desired properties may include a specific GWP. In an embodiment, a composition having a GWP of at or about or less than 300 may be desired. In an embodiment, a composition having a GWP of at or about or less than 200 may be desired. In an embodiment, a composition having a GWP of at or about or less than 150 may be desired. In an embodiment, a composition having a GWP of at or about 150 to at or about 300 may be desired. In such embodiments, the useful compositions 141 and the preferred compositions 130 in FIG. 3 would include those compositions with the desired GWP.

In an embodiment, the desired property of the capacity being equal or greater than 85% of the capacity of R410A may be different. In an embodiment, a composition having a capacity at or about or greater than 90% of the capacity of R410A may be desired. In an embodiment, a composition having a capacity at or about or greater than 95% of the capacity of R410A may be desired. In an embodiment, a composition having a capacity at or about or greater than the capacity of R410A may be desired. In such embodiments, the useful compositions 141 and preferred compositions 150 shown in FIG. 4 would include the compositions that have the desired capacity.

In an embodiment, a desired property of the temperature glide may be different than 10° F. In an embodiment, a composition having a temperature glide at or about or less than 15° F. may be desired. In an embodiment, a composition having a temperature glide at or about or less than 12° F. may be desired. In such embodiments, the useful compositions 130 would include those compositions with the desired temperature glide. In an embodiment, a composition having a temperature glide at or about or less than 5° F. may be desired. In such embodiments, the useful compositions 141 and preferred compositions 150 in FIG. 4 would include those compositions with the desired temperature glide.

Figure 5:
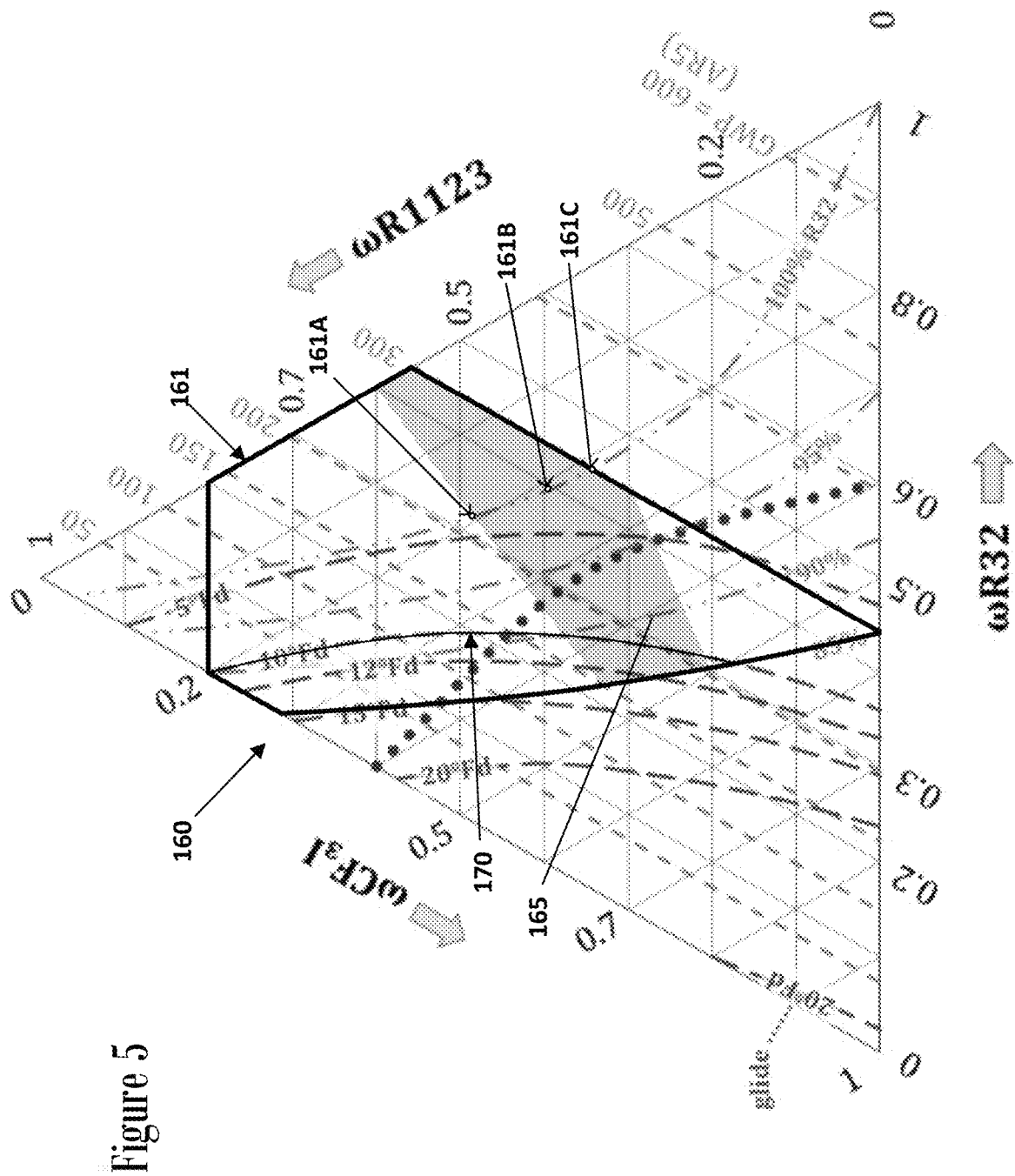
Figure 6:
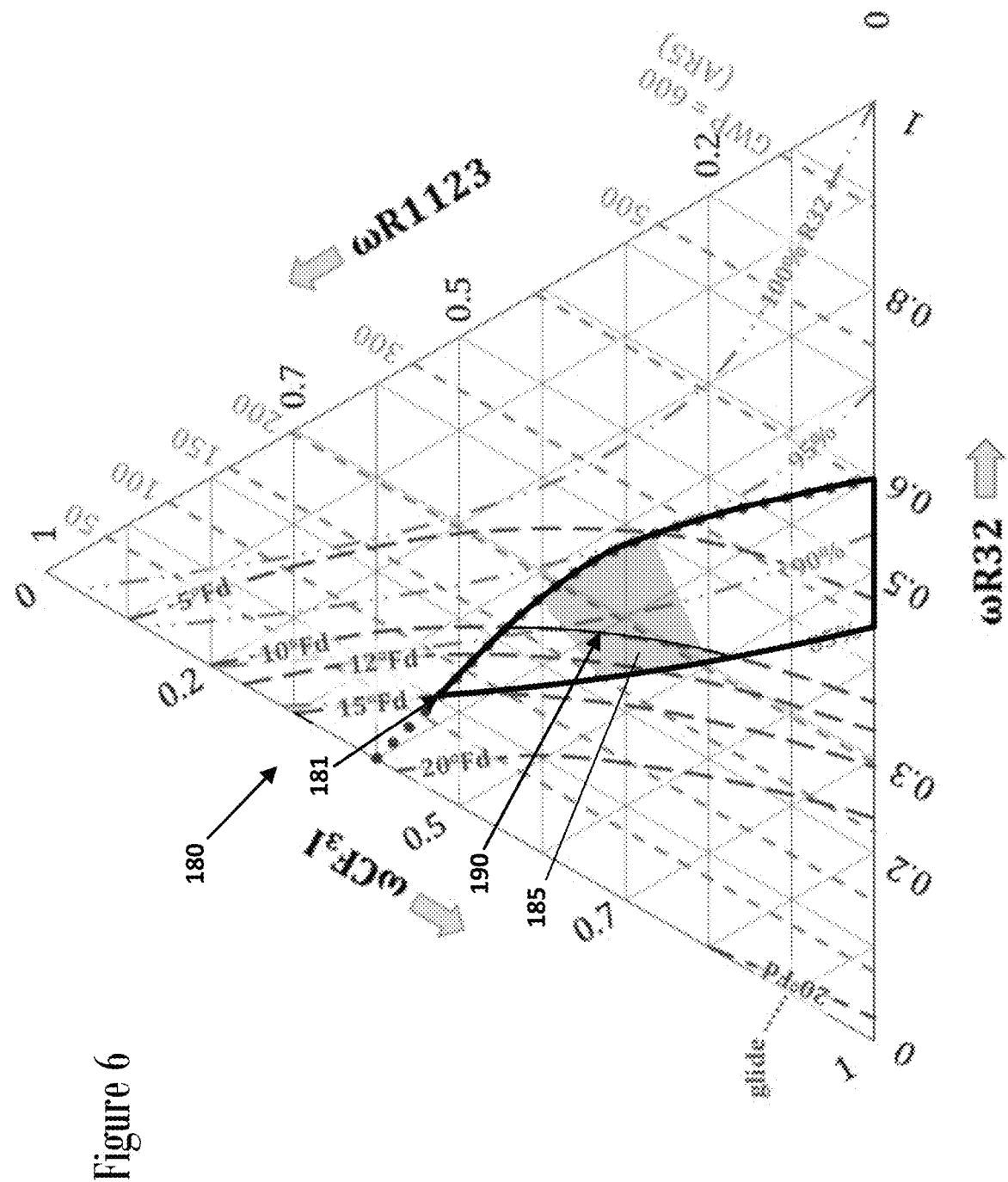

Each of FIGS. 5 and 6 illustrate a matrix 160, 180 based on matrix 100 of FIG. 2 and has the same sides and vertices as the matrix 100 of FIG. 2. Each matrix 160, 180 is the same as the matrix 100 of FIG. 2, except the matrices 160, 180 do not include capacities relative to R410A and illustrate ranges of compositions that may be desirable based on a specific set of desired properties. Each matrix 160, 180 can be used in a method of making a refrigerant composition of R1123, R32, and $CF_3I$ having one or more desired properties.

In an embodiment, a desired set of properties of a refrigerant composition includes being stable, having a GWP at or about or less than 300, and having a capacity that is at or about or greater than 85% of the capacity of R32. Based on these desired properties, a range of useful refrigerant compositions 161 is shown in matrix 160 of FIG. 5. As discussed above, a composition having at or about or less than 80 wt % of R1123 may be stable as the composition contains a large enough amount of other refrigerants (e.g., CF3I and R32) to prevent the R1123 from decomposing. Accordingly, this end point of at or about or less than 80% may be changed for the amount of R1123 may be updated based on further testing. The useful refrigerant compositions 161 include at or about 44 wt %, or less than 44 wt % and greater than 0 wt % of R32; at or about 80 wt %, or less than 80 wt % of R1123 and greater than 0 wt % of R1123; and at or about 56 wt %, or less than at about 56 wt % and greater than 0 wt % of $CF_3I$.

In an embodiment, the useful compositions 161 may include preferred compositions 170 as shown in FIG. 5. The properties of the preferred compositions 170 are that they have a capacity at or about or greater than 85% of the capacity of R32, a GWP at or about or less than 300, and a temperature glide at or about or less than 10° F. The preferred compositions 161 include at or about 44 wt %, or less than 44 wt % and greater than 0 wt % of R32; at or about 80 wt %, or less than 80 wt % and greater than 0 wt % of R1123; and at or about 56 wt %, or less than 56% and greater than 0 wt % of $CF_3I$.

FIG. 5 also includes a shaded area 165. The compositions within the shaded area 165 have a ratio of R1123 to R32 (R1123:R32) by weight that is from at or about 60:40 to at or about 40:60. In an embodiment, compositions having a ratio of R1123 to R32 that is from about 60:40 to about 40:60 have higher stability. In some embodiments, a set of desired properties may include higher stability. In such embodiments, the useful compositions 161 and preferred compositions 170 shown in FIG. 5 would include those compositions that are also within the shaded area 165.

Of the useful compositions 161, compositions 161A-161C may be desired in an embodiment as they have a capacity that is comparable to R32. Composition 161B has a ratio of R1123 to R32 (R1123:R32) of 50:50. Composition 161A includes at or about 48.6% of R1123, about or about 32.4% of R32, and at or about 19% of $CF_3I$. Composition 161B includes at or about 39.5% of R1123, about or about 39.5% of R32, and at or about 21.0% of $CF_3I$. Composition 161C includes at or about 34% of R1123, about or about 44% of R32, and at or about 22% of $CF_3I$. Thermodynamic properties for compositions 161A-161C are shown below in Table 2. Table 2 also includes the reference properties used for R32. The properties in Table 2 were calculated in a similar manner as discussed above regarding Table 1.

TABLE 2

Properties of R32 and Compositions 161A, 161B, 161C

|  | R32 | 135A | 135B | 135C |
| --- | --- | --- | --- | --- |
| Capacity* | 0.983[1] | 100.2% | 100.0% | 99.8% |
| GWP | 677 | 220 | 268 | 298 |
| Coefficient of Performance* | 4.513 | 95.5% | 96.4% | 97.0% |
| Compressor Discharge Temperature* | 202.0 | +14.3° F. | +13.0° F. | +12.2° F. |
| Mass Flow Rate* | 108.6 $lb_m/ft^3$ | 160.2% | 154.2% | 150.4% |
| Density (Liquid)* | 53.77 | 111.2% | 112.2% | 112.7% |
| Temperature Glide (at compressor) | 0.0 | 3.3° F. | 3.6° F. | 4.1° F. |
| Compressor Pressure Ratio (Discharge Pressure:Suction Pressure)* | 2.59 | 99.2% | 99.3% | 99.6% |
| Isentropic Enthalpy Increase | 17.14 | 65.4% | 67.2% | 68.5% |

*Property for Compositions 161A, 161B, and 161C are relative to R32 (100% being equal to R410A).
[1]Tons per CFM of compressor displacement (assumed to be fixed).

In an embodiment, the desired property of the GWP being equal or less than 300 may be different. In an embodiment, a composition having a GWP of at or about or less than 200 may be desired. In an embodiment, a composition having a GWP of at or about or less than 150 may be desired. In an embodiment, a composition having a GWP of at or about 150 to at or about 300 may be desired. In such embodiments, the useful compositions 161 and the preferred compositions 170 in FIG. 5 would include those compositions with the desired GWP.

In an embodiment, the desired property of the capacity being equal or greater than 85% of the capacity of R32 may be different. In an embodiment, a composition having a capacity at or about or greater than 90% of the capacity of R32 may be desired. In an embodiment, a composition having a capacity at or about or greater than 95% of the capacity of R32 may be desired. In an embodiment, a composition having a capacity at or about or greater than the capacity of R32 may be desired. In such embodiments, the useful compositions 161 and preferred compositions 170 shown in FIG. 5 would include the compositions that have the desired capacity.

In an embodiment, a desired property of the temperature glide may be different than 10° F. In an embodiment, a composition having a temperature glide at or about or less than 15° F. may be desired. In an embodiment, a composition having a temperature glide at or about or less than 12° F. may be desired. In such embodiments, the useful compositions shown in FIG. 5 would include those compositions with the desired temperature glide. In an embodiment, a composition having a temperature glide at or about or less than 5° F. may be desired. In such an embodiment, the useful compositions 161 and preferred compositions 170 in FIG. 5 would include those compositions with the desired temperature glide.

In an embodiment, a desired set of properties of a refrigerant composition includes being nonflammable and having a capacity that is at or about or greater than 85% of the capacity of R32. Based on these desired properties, a range of useful refrigerant compositions 180 is shown in matrix 180 of FIG. 6. The useful refrigerant compositions 181 include at or about 10% to at or about 60 wt % of R32; at or about 53 wt %, or less than 53 wt % and greater than 0 wt % of R1123; and at or about 32 wt % to at or about 56% of $CF_3I$.

In an embodiment, the useful compositions 181 may include preferred compositions 190 as shown in FIG. 6. The properties of the preferred compositions 130 are that they have a capacity at or about or greater than 85% of the capacity of R32, a GWP at or about or less than 300, and a temperature glide at or about or less than 10° F. The preferred compositions 181 include at or about 23% to at or about 60 wt % of R32; at or about 43 wt %, or less than 43 wt % and greater than 0 wt % of R1123; and at or about 32 wt % to at or about 56% of $CF_3I$.

FIG. 6 also includes a shaded area 185. The compositions within the shaded area 185 have a ratio of R1123 to R32 (R1123:R32) by weight that is from at or about 60:40 to at or about 40:60. In an embodiment, compositions having a ratio of R1123 to R32 that is from about 60:40 to about 40:60 have higher stability. In some embodiments, a set of desired properties may include higher stability. In such embodiments, the useful compositions 181 and preferred compositions 190 shown in FIG. 6 would include those compositions that are also within the shaded area 185.

In an embodiment, the set of desired properties may include a specific GWP. In an embodiment, a composition having a GWP of at or about or less than 300 may be desired. In an embodiment, a composition having a GWP of at or about or less than 200 may be desired. In an embodiment, a composition having a GWP of at or about or less than 150 may be desired. In an embodiment, a composition having a GWP of at or about 150 to at or about 300 may be desired. In such embodiments, the useful compositions 181 and the preferred compositions 190 in FIG. 6 would include those compositions with the desired GWP.

In an embodiment, the desired property of the capacity being equal or greater than 85% of the capacity of R32 may be different. In an embodiment, a composition having a capacity at or about or greater than 90% of the capacity of R32 may be desired. In an embodiment, a composition having a capacity at or about or greater than 95% of the capacity of R32 may be desired. In such embodiments, the useful compositions 181 and preferred compositions 190 shown in FIG. 6 would include the compositions that have the desired capacity.

In an embodiment, a desired property of the temperature glide may be different than 10° F. In an embodiment, a composition having a temperature glide at or about or less than 12° F. may be desired. In such an embodiment, the useful compositions 181 shown in FIG. 6 would include those compositions with the desired temperature glide. In an embodiment, a composition having a temperature glide at or about or less than 5° F. may be desired. In such an embodiment, the useful compositions 181 and preferred compositions 190 in FIG. 6 would include those compositions with the desired temperature glide.

Each of FIGS. 7A-7D illustrates a matrix 200, 210, 220, 230 of a thermodynamic property for compositions of R1123, R32, and $CF_3I$ by weight percentage. Compositions in each matrix 200, 210, 220, 230 are calculated similarly to the matrixes 100, 120, 140, 160, 180 in FIG. 2-6. Accordingly, in FIGS. 7A-7D, the axes of R1123 are horizontal and parallel to the side for R32, the axes for R32 are parallel to the side for $CF_3I$, and the axes for $CF_3I$ are parallel to the side for R1123. Each matrix 200, 210, 220, 230 shows values at each 10 wt % of R1123, R32, and $CF_3I$. For example, composition 201 in FIG. 7A corresponds to a composition of 70 wt % R1123, 20 wt % R32, and 10 wt % $CF_3I$.

Figure 7A:
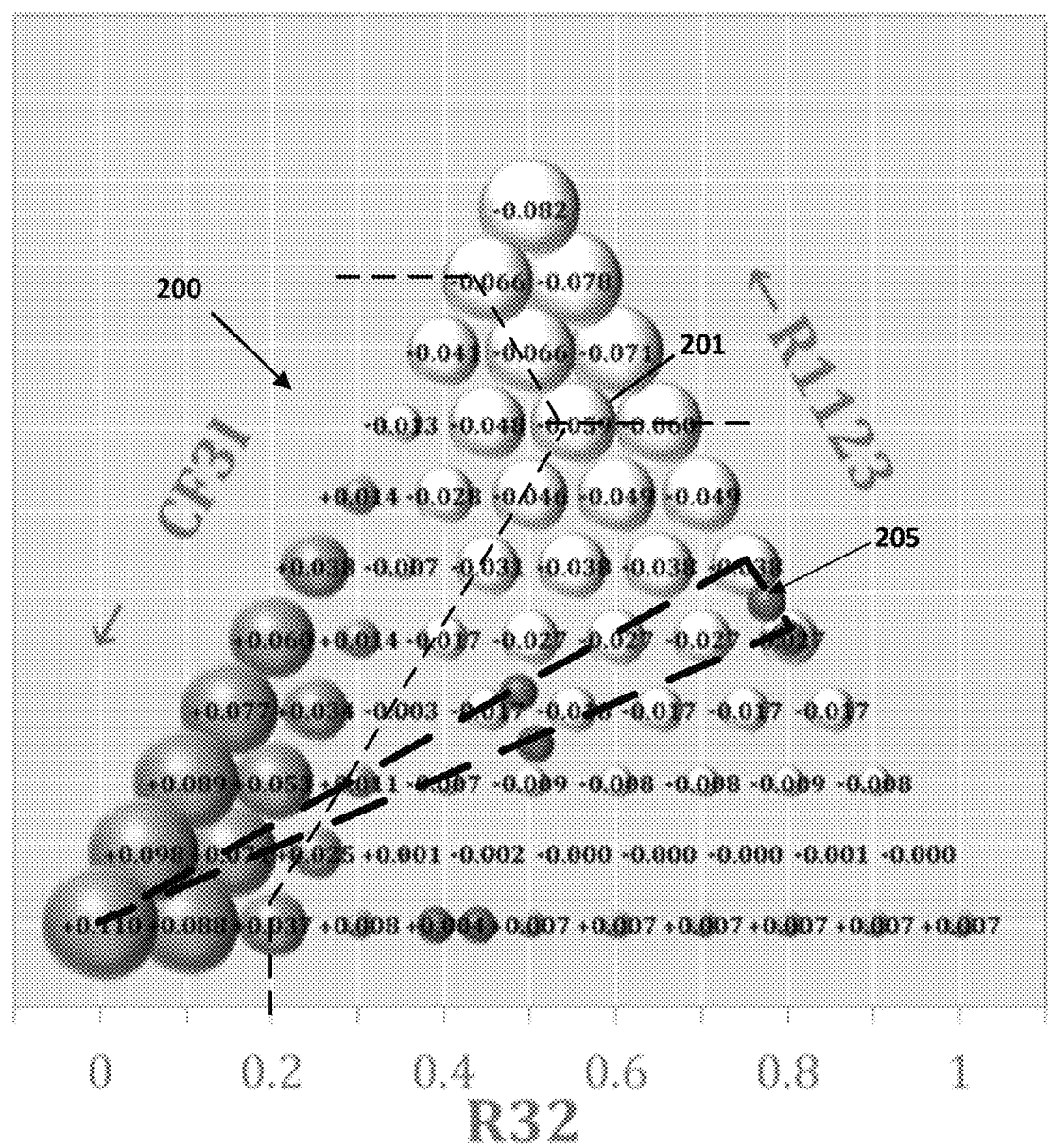
FIGS. 7A-7D each illustrate a matrix of a thermodynamic property of compositions of R1123, R32, and $CF_3I$.
Figure 7B:
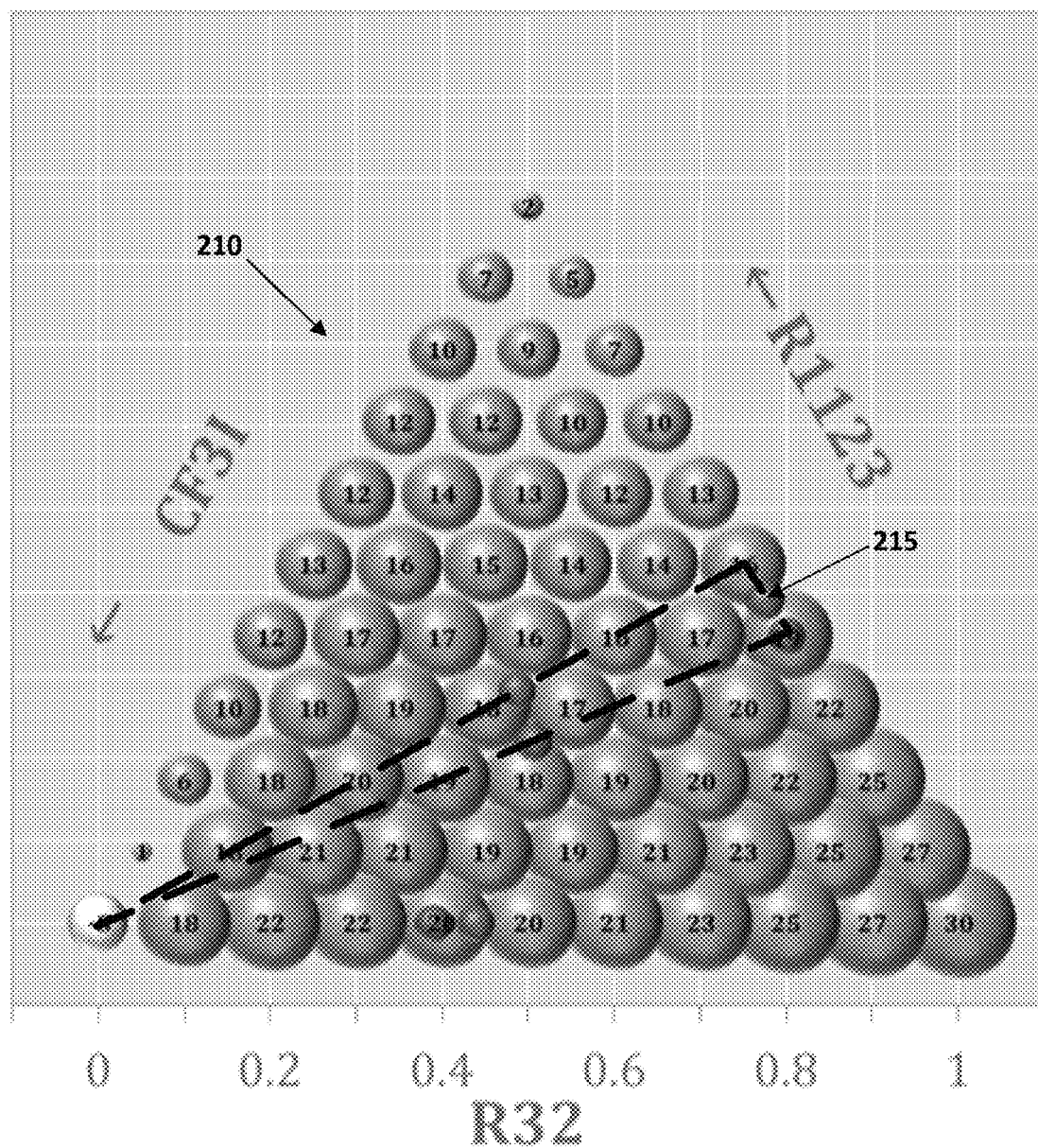
Figure 7C:
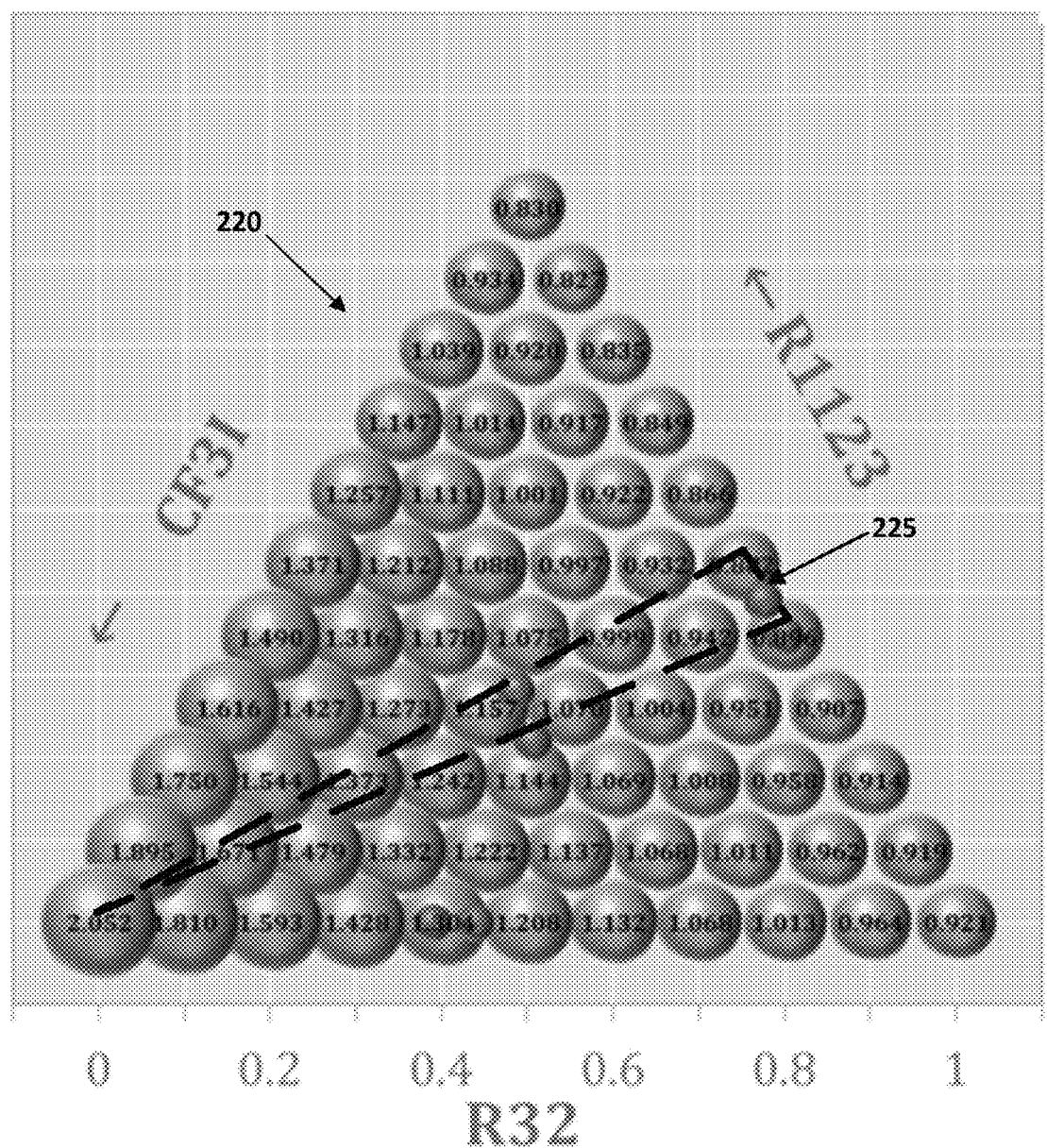
Figure 7D:
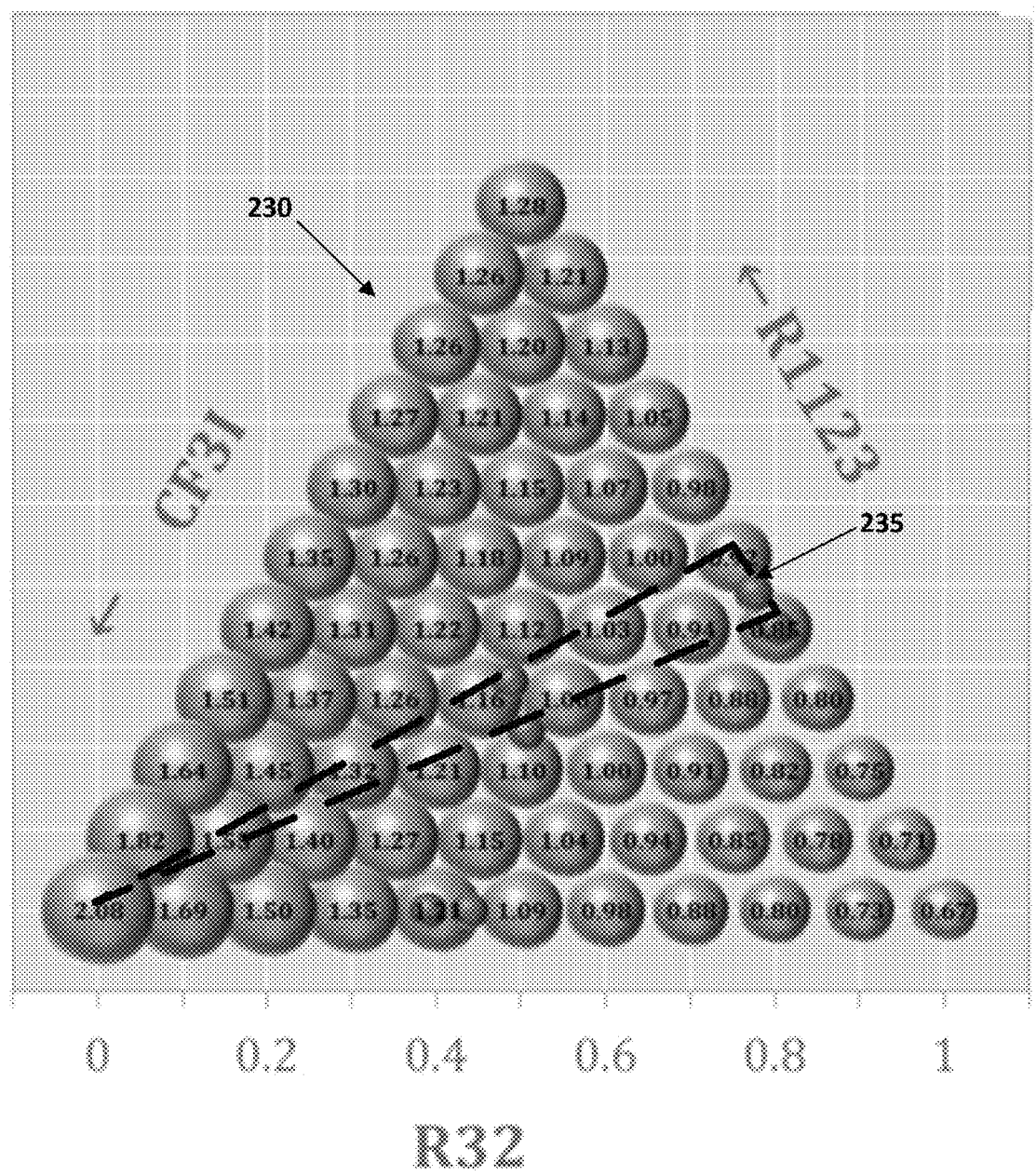

FIG. 7A illustrates a matrix 200 of coefficients of performance (relative to R410A) for compositions of R1123, R32, and $CF_3I$. FIG. 7B illustrates a matrix 210 of compressor discharge temperatures in Fahrenheit (relative to R410A) for compositions of R1123, R32, and $CF_3I$. FIG. 7C illustrates a matrix 220 of densities of each composition when in a liquid phase (relative to R410A) for compositions of R1123, R32, and $CF_3I$. FIG. 7D illustrates a matrix 230 of mass flow rates (relative to R410A) for compositions of R1123, R32, and $CF_3I$.

Each matrix 200, 210, 220, 230 also specifies a range of compositions 205, 215, 225, 235. The compositions within said range 205, 215, 225, 235 have a ratio of R1123 to R32 (R1123:R32) by weight that is from at or about 60:40 to at or about 40:60. As shown by FIG. 7A, the thermodynamic efficiency increases as the amount of $CF_3I$ in a composition decreases. Compositions within the range 205 and near the middle of the matrix 200 (e.g., near compositions have equal amounts of R1123/R32/$CF_3I$) having a similar thermodynamic efficiency as R410A. As shown by FIG. 7B, compositions in the range 215 result in a moderate change in compressor discharge temperature of about 15° F. to about 20° F. This range is higher than may be produced when using R452B (another proposed alternative to R410A), but is less than the about 30° F. that occurs with using R32. As shown by FIG. 7C, the compositions in the range 225 have a density that is comparable to R410A. Compositions near the middle of the matrix 220 within the range 225 have a density that is about the same as R410A. As shown in FIG. 7D, compositions in the range 235 have slightly higher flow rates, but are similar near the middle of the matrix 235.

Performance of a refrigerant composition may be based on one or more of a coefficient of performance, compressor discharge temperature, liquid density, and mass flow rate. In an embodiment, the desired set of properties includes one or more of a coefficient of performance (relative to R410A), compressor discharge temperature (relative to R410A), mass flow rate (relative to R410A), and operating pressure (relative to R410A). In an embodiment, a composition that has a coefficient of performance of greater than 97% relative to R410A may be preferred. In an embodiment, a composition that results in a change in the compressor discharge temperature, relative to R410A, that is at or about or less than 32° F. may be desired. In an embodiment, a composition that results in a change in the compressor discharge temperature, relative to R410A, that is at or about or less than 20° F. may be preferred. In an embodiment, a composition that results in a mass flow rate of at or about or less than 1.5 times greater than R410A may be desired. In an embodiment, a composition that results in a mass flow rate of at or about or less than 1.2 times greater than R410A may be desired. In an embodiment, a composition that results in a mass flow rate of at or about or less than 1.1 times greater than R410A may be desired. In an embodiment, a composition that has a liquid density that is at or about or less than 1.5 may be desired. In an embodiment, a method of making a refrigerant composition utilizes one or more of the matrices of FIGS. 2-7D so that the refrigerant composition has a desired set of properties.

Figure 8:
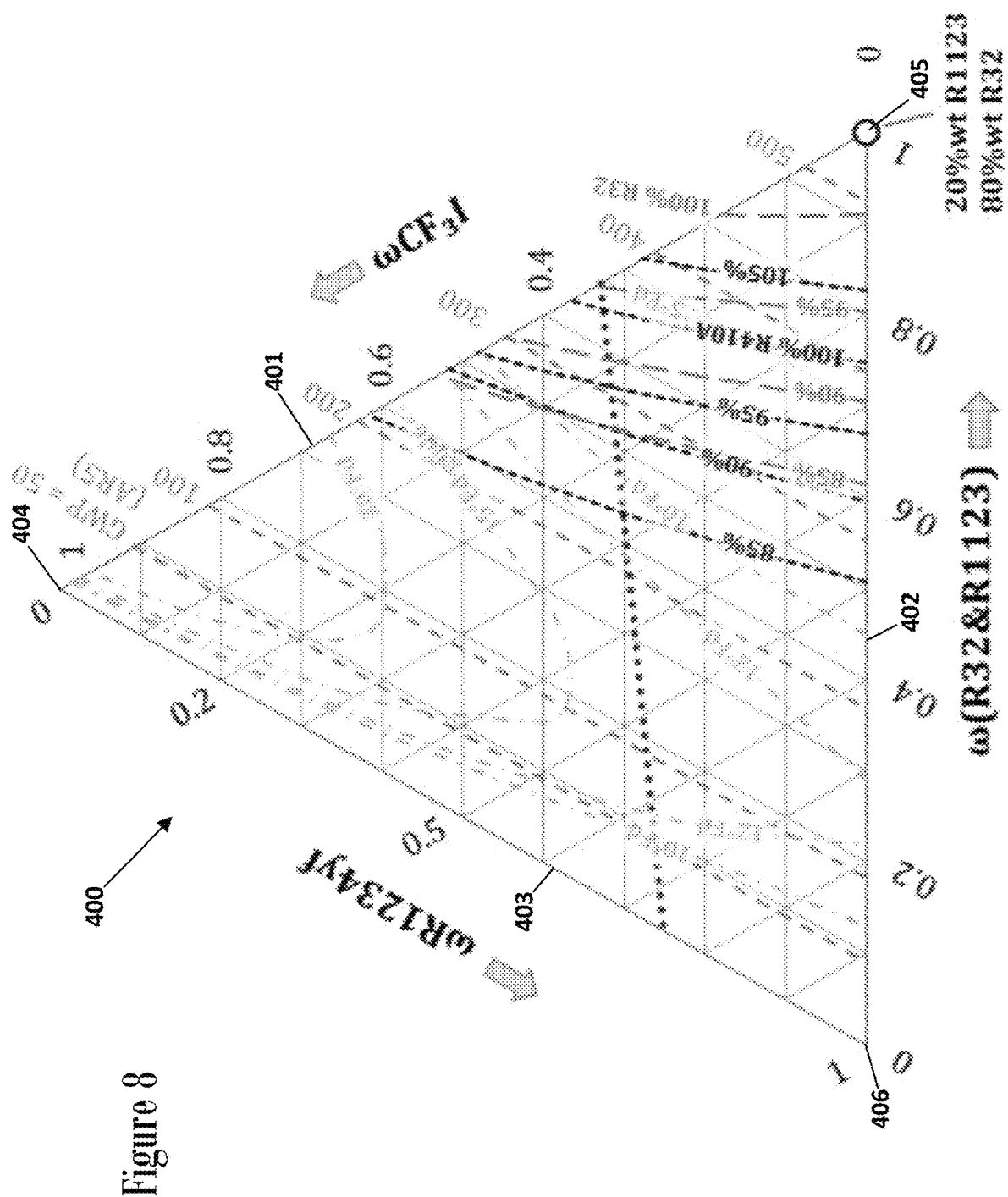
FIG. 8 illustrates a matrix of compositions of R1234yf, R1123, R32, and $CF_3I$ showing plots of GWP, flammability, temperature glide, capacity relative to R410A, and capacity relative to R32.

FIG. 8 illustrates a matrix 400 that was developed to show plots of GWP, flammability, temperature glide, capacity relative to R410A, and capacity relative to R32 as function of the concentration of R1234yf, a mixture of 80 wt % of R32 and 20 wt % of R1123, and $CF_3I$. Each side 401, 402, 403 of the triangle corresponds to weight percentages of $CF_3I$, the mixture of 80 wt % R32 and 20 wt % of R1123, and R1234yf, respectively. Each vertex 404, 405, 406 corresponds to a composition of 100 wt % R1123; the mixture of 80 wt % R32 and 20% R1123; and $CF_3I$, respectively.

Figure 9:
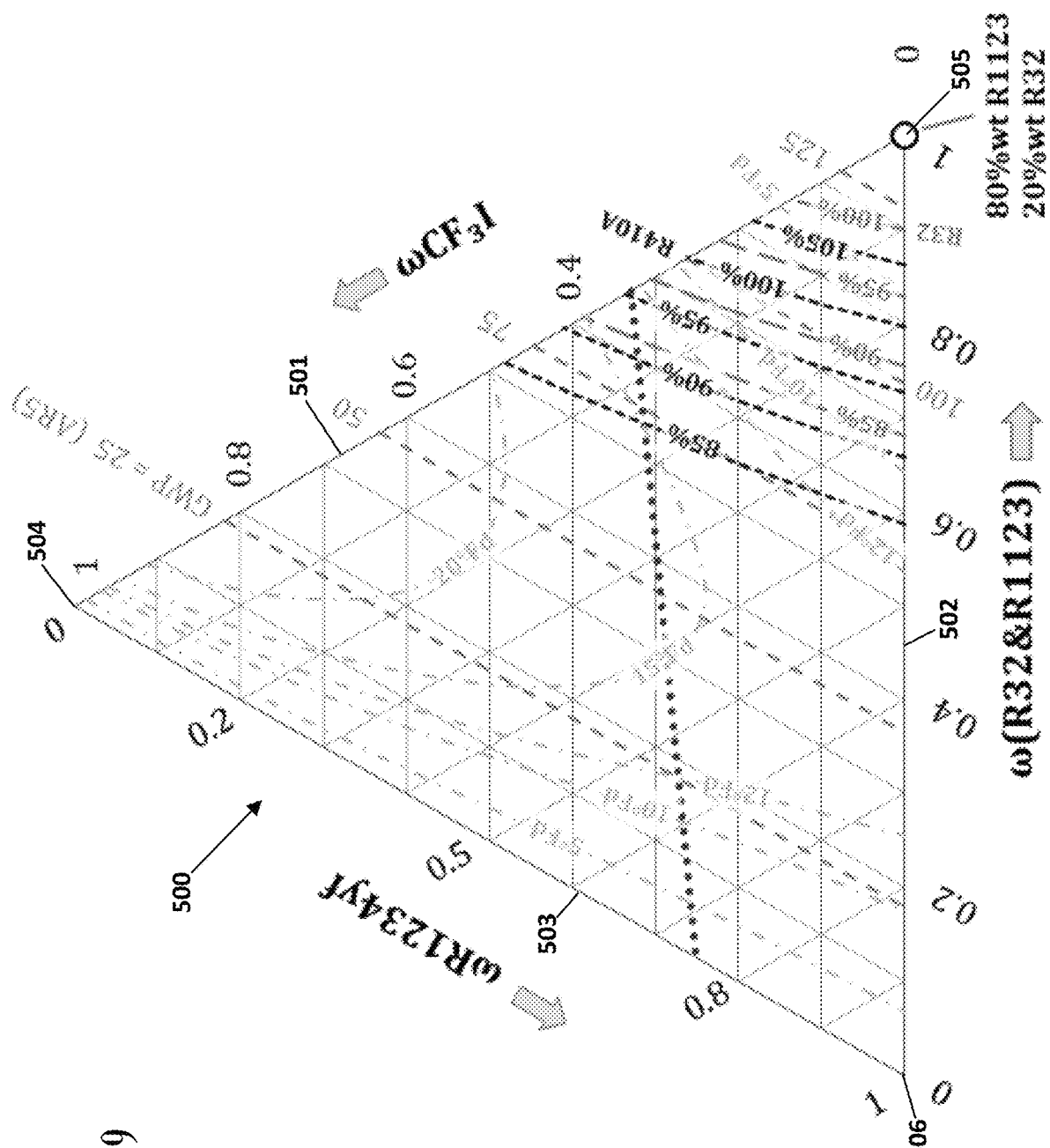
FIG. 9 illustrates a matrix of compositions of R1234yf, R1123, R32, and $CF_3I$ showing plots of GWP, flammability, temperature glide, capacity relative to R410A, and capacity relative to R32

FIG. 9 illustrates a matrix 500 that was developed to show plots of GWP, flammability, temperature glide, capacity relative to R410A, and capacity relative to R32 as function of the concentration of R1234yf, a mixture of 80 wt % and 20 wt % of R1123, and $CF_3I$. Each side 501, 502, 503 of the triangle corresponds to weight percentages of $CF_3I$, the mixture of 20 wt % R32 and 80 wt % of R1123, and R1234yf, respectively. Each vertex 504, 505, 506 corresponds to a composition of 100 wt % R1123; the mixture of 20 wt % R32 and 80% R1123; and $CF_3I$, respectively.

Properties (e.g., GWP, flammability, capacity relative to R410A or R32) of a refrigerant composition with a weight percent of R1234yf, R1123, R32, and $CF_3I$ can be estimated by interpolating between the matrix 400 in FIG. 8 and the matrix 500 in FIG. 9. Alternatively, a matrix similar to the matrixes 400 in FIG. 8 and the matrix 500 in FIG. 9 may be calculated in the same manner as discussed above for ratios of R1123 and R32 that are between 80:20 and 20:80 b. The upper limit of 80 wt % was selected as R1123 may decompose when a composition contains greater than 80 wt % R1123. The upper limit of 80% of R32 was selected as greater amounts of R32 result in compositions with GWPs that are greater than 550.

Properties of the compositions for each matrix 400, 500 were estimated using a thermodynamic model. The boundary between flammable and non-flammable compositions is shown by the dotted line extending in an almost horizontal direction. Flammable compositions are below the boundary and non-flammable compositions are above boundary. The boundary is based on the known flammability characteristics of R1123, R32, $CF_3I$, R410A, and R1234yf, and the flame suppressant properties of $CF_3I$. GWP is based on the GWP of individual components and the method described in ASHRAE Standard 34 for calculating the GWP of refrigerant blends. The flammability boundary is estimated based on known characteristics of the individual components and various binary mixtures of the components. Accordingly, the amount of each refrigerant in a composition along the flammability boundary may, for example, vary by about 5 percent in an embodiment. It should be appreciated the compositions and ranges shown and/or described may be updated based on further testing to confirm the location of the flammability boundary.

Figure 10:
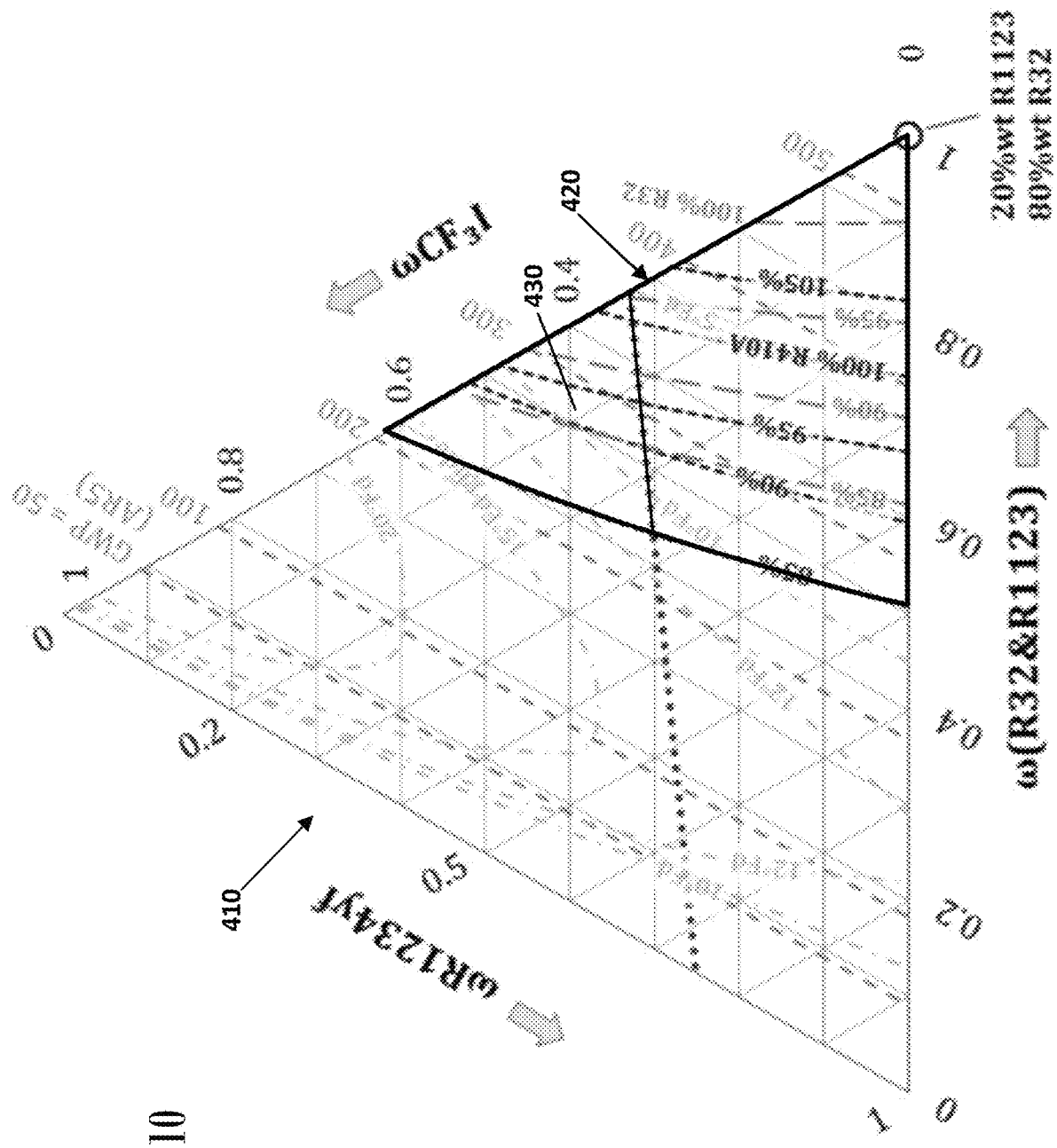
FIG. 10 illustrates a matrix based on the matrix of FIG. 8 that can be used to select a refrigerant composition with a desired set of properties in an embodiment.
Figure 12:
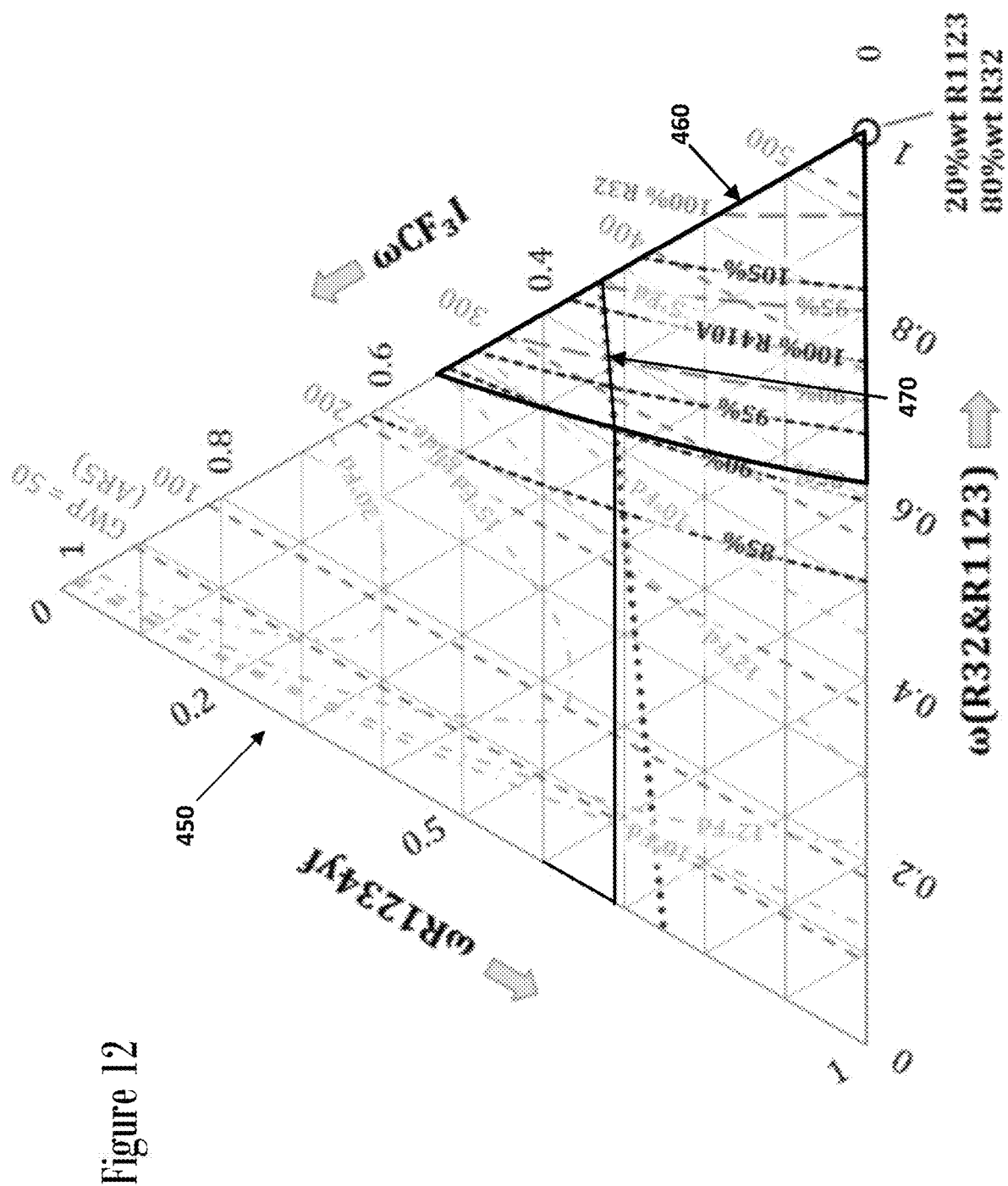
FIG. 12 illustrates a matrix based on the matrix of FIG. 8 that can be used to select a refrigerant composition with a desired set of properties in an embodiment.

Each of FIGS. 10 and 12 illustrate a matrix 410, 450 based on matrix 400 of FIG. 8 and has the same sides and vertices as the matrix 400 of FIG. 8. Each matrix 410, 450 is the same as the matrix 400 of FIG. 8, except that the matrixes 410, 450 illustrates ranges of refrigerant compositions that may be desired in particular embodiments. Matrix 410 in FIG. 10 illustrates ranges of refrigerant compositions with capacities relative to R410A. Matrix 450 in FIG. 12 illustrates ranges of refrigerant compositions with capacities relative to R32.

Figure 11:
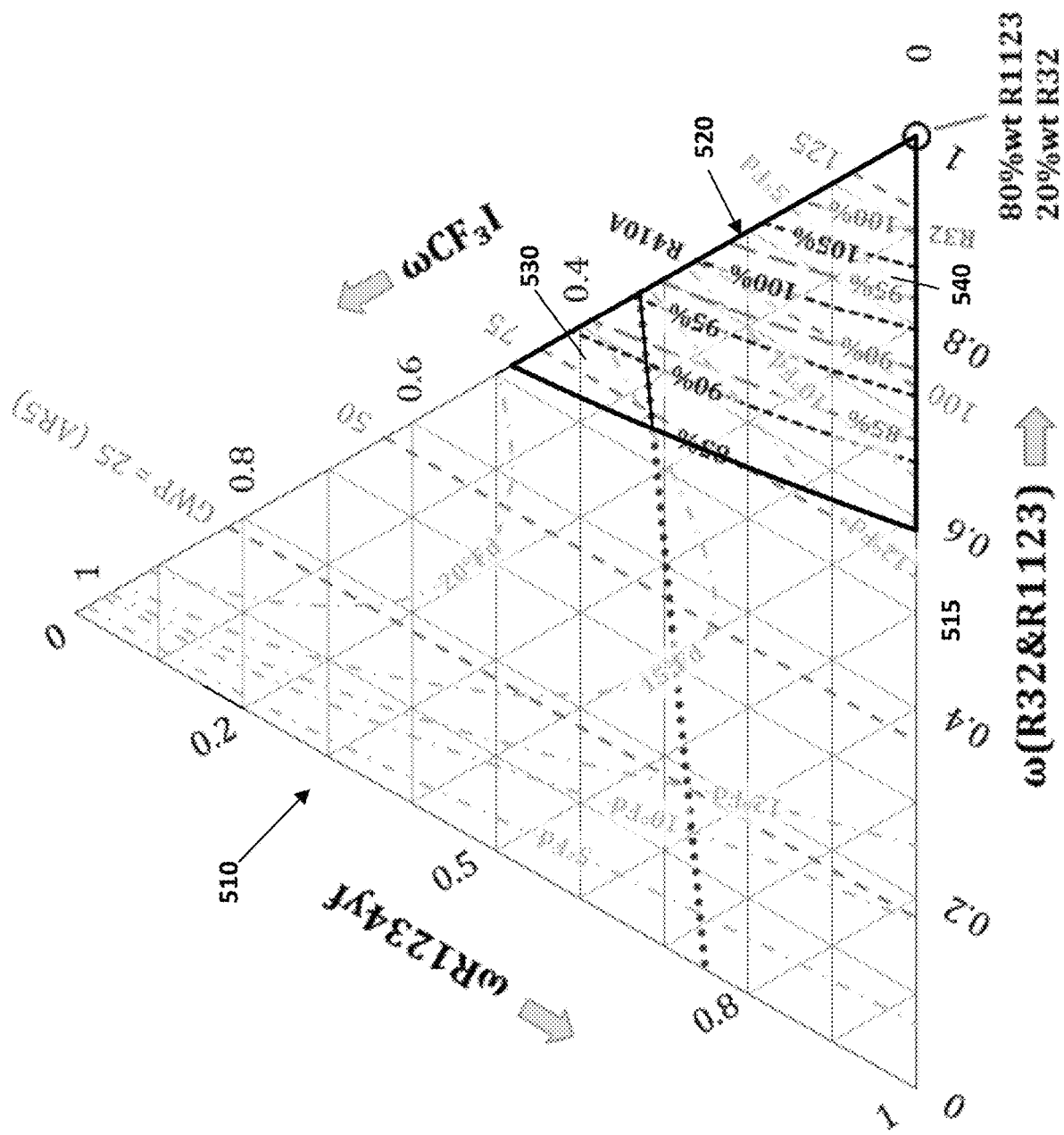
FIG. 11 illustrates a matrix based on the matrix of FIG. 9 that can be used to select a refrigerant composition with a desired set of properties in an embodiment.
Figure 13:
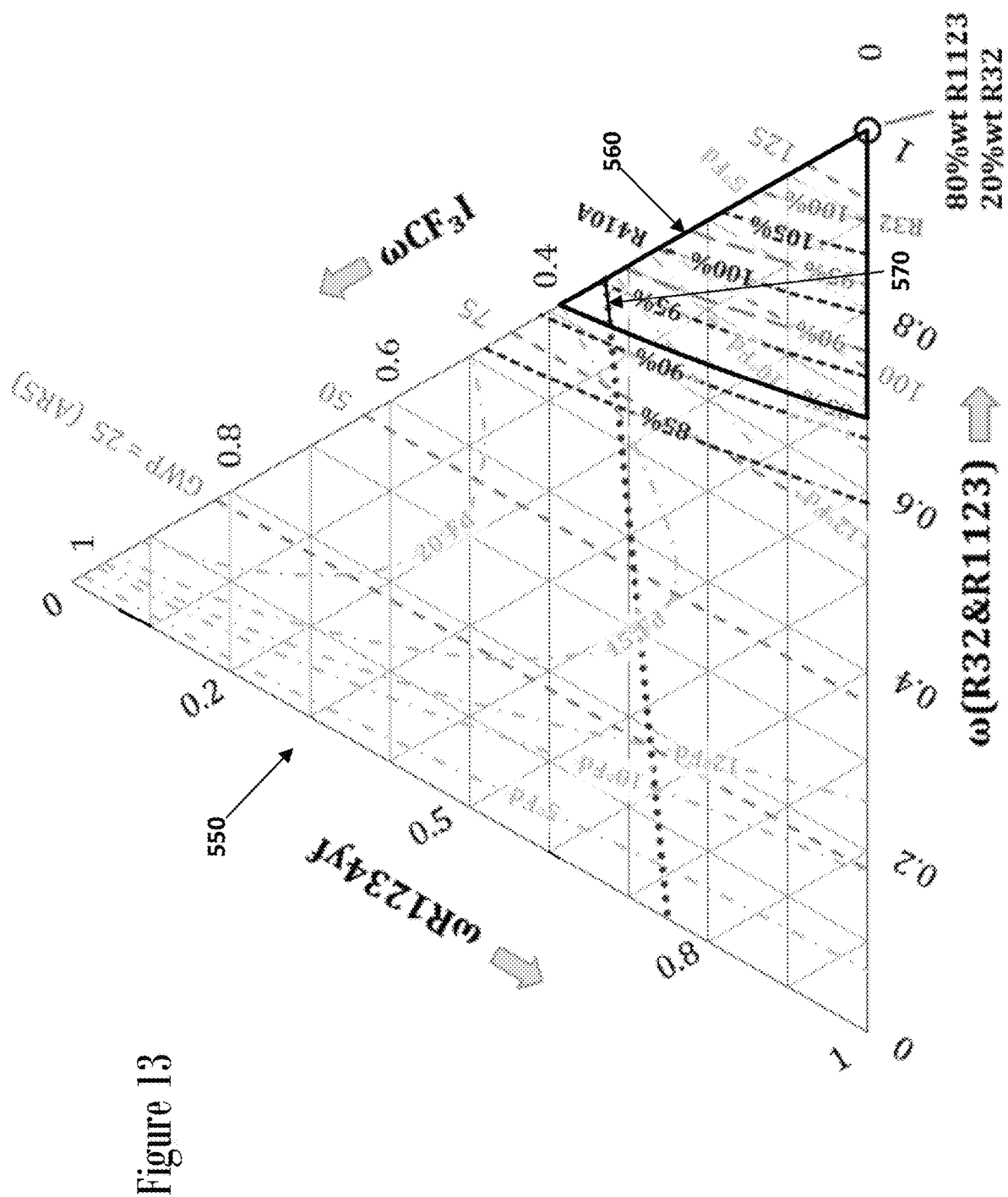
FIG. 13 illustrates a matrix based on the matrix of FIG. 9 that can be used to select a refrigerant composition with a desired set of properties in an embodiment.

Each of FIGS. 11 and 13 illustrate a matrix 510, 550 based on matrix 500 of FIG. 9 and has the same sides and vertices as the matrix 500 of FIG. 9. Each matrix 510, 550 is the same as matrix 500 of FIG. 8, except that matrices 510, 550 illustrate ranges of refrigerant blends that may be desired in particular embodiments. Matrix 510 of FIG. 11 illustrates ranges of refrigerant compositions with capacities relative to R410A. Matrix 550 in FIG. 13 illustrates ranges of refrigerant compositions with capacities relative to R32.

The matrixes 410, 450, 510, 550 can be used to determine composition(s) with a desired set of properties and in a method of making a refrigerant composition of R1234yf, R1123, R32, and $CF_3I$ having one or more desired properties. In particular, matrixes 410, 510 may be used together to determine compositions having capacities relative to R410, and matrixes 450, 550 may be used together to determine compositions have capacities relative to R32.

In an embodiment, a desired set of properties of a refrigerant composition includes being stable and having a capacity that is at or about or greater than 85% of the capacity of R410A. Based on thmay be desired properties, useful refrigerant compositions may be determined based on the useful refrigerant compositions 420 of FIG. 10 and the useful refrigerant compositions 520 of FIG. 11.

The useful refrigerant compositions 420 in FIG. 10 include less than 49% R1234yf and greater than 0% of R1234yf; at or about 30.4 wt % (80 wt % of R32 in mixture×38% of mixture in composition), or greater than 30.4 wt % and less than 80 wt % of R32; at or about 7.6 wt % (20 wt % of R1123 in mixture×38 wt % of mixture in composition), or greater than 7.6 wt % and less than 20 wt % of R1123; and at or about 62 wt %, or less than at about 62 wt % and greater than 0 wt % of $CF_3I$.

The useful refrigerant compositions 520 in FIG. 11 include less than 42% R1234yf and greater than 0% of R1234yf; at or about 10.4 wt % (20 wt % of R32 in mixture×52 wt % of mixture in composition), or greater than 10.4 wt % and less than 20 wt % of R32; at or about 41.6 wt % (80 wt % of R1123 in mixture×52% of mixture in composition), or greater than 41.6 wt % and less than 80 wt % of R1123; and at or about 48 wt %, or less than at about 48 wt % and greater than 0 wt % of $CF_3I$.

Accordingly, based on the ranges of each useful refrigerant compositions 420, 520, useful refrigerant compositions may include less than 100% R1234yf and greater than 0% of R1234yf; from at or about 10.2 wt % to at or about 30.4 wt % of R32; from at or about 7.6 wt % to at or about 40.8 wt % of R1123; and at or about 62 wt %, or less than at about 62 wt % and greater than 0 wt % of $CF_3I$.

In an embodiment, a desired set of properties of a refrigerant composition includes being stable, being nonflammable, and having a capacity that is at or about or greater than 85% of the capacity of R410A. In an embodiment, the useful compositions 420 in FIG. 10 may include preferred refrigerant compositions 430 that are nonflammable and the useful refrigerant compositions 520 in FIG. 11 may include preferred refrigerant compositions 530 that are nonflammable. Based on thmay be desired properties, preferred refrigerant compositions may be determined based on the preferred refrigerant compositions 430 of FIG. 10 and the preferred refrigerant compositions 530 of FIG. 11.

The preferred refrigerant compositions 430 of FIG. 10 include at or about 27 wt %, or less than 27 wt % and greater than 0% of R1234yf; at or about 30.4 wt % (80 wt % of R32 in mixture×38 wt % of mixture in composition) to at or about 53.6 wt % (80 wt % of R32 in mixture×67 wt % of mixture in composition) of R32; at or about 7.6 wt % (20 wt % of R1123 in mixture×38 wt % of mixture in composition) to at or about 13.4 wt % (20 wt % of R1123 in mixture×67 wt % of mixture in composition) of R1123; and at or about 30 wt % to at or about 62 wt % of $CF_3I$.

The preferred refrigerant compositions 530 in FIG. 11 include at or about 15 wt %, or less than 15 wt % of R1234yf and greater than 0% of R1234yf; from at or about 10.4 wt % (20 wt % of R32 in mixture×52 wt % of mixture in composition) to at or about 13.4 wt % (20 wt % of R32 in mixture×67 wt % of mixture in composition) of R32; from at or about 41.6 wt % (80 wt % of R1123 in mixture×52 wt % of mixture in composition) to at or about 53.6 wt % (80 wt % of R1123 in mixture×67% of mixture in composition) of R1123; and at or about 31 wt % to at or about 48 wt % of $CF_3I$.

Accordingly, based on the ranges of each preferred refrigerant compositions 430, 530, refrigerant compositions include at or about 27 wt %, or less than 27 wt % and greater than 0 wt % of R1234yf; from at or about 10.4 wt % to at or about 53.6 wt % of R32; at or about 7.6 wt % to at or about 53.6 wt % of R1123; and at or about 30 wt % to at or about 62 wt % of $CF_3I$.

In an embodiment, the set of desired properties may include a specific GWP. In an embodiment, a composition having a GWP of at or about or less than 400 may be desired. In an embodiment, a composition having a GWP of at or about or less than 300 may be desired. In an embodiment, a composition having a GWP of at or about or less than 150 may be desired. In an embodiment, a composition having a GWP of at or about 150 to at or about 300 may be desired. In such embodiments, the useful refrigerant compositions 420, 520 and the preferred refrigerant compositions 430, 530 in FIGS. 10 and 11 would include those compositions with the desired GWP.

In an embodiment, the desired property of the capacity being equal or greater than 85% of the capacity of R410A may be different. In an embodiment, a composition having a capacity at or about or greater than 90% of the capacity of R410A may be desired. In an embodiment, a composition having a capacity at or about or greater than 95% of the capacity of R10 may be desired. In such embodiments, the useful refrigerant compositions 420, 520 and the preferred refrigerant compositions 430, 530 in FIGS. 10 and 11 would include those compositions with the desired capacity.

In an embodiment, the set of desired properties may include a specific temperature glide. In an embodiment, a composition having a temperature glide at or about or less than 15° F. may be desired. In an embodiment, a composition having a temperature glide at or about or less than 12° F. may be desired. In an embodiment, a composition having a temperature glide at or about or less than 10° F. may be desired. In an embodiment, a composition having a temperature glide at or about or less than 5° F. may be desired. In such embodiments, the useful refrigerant compositions 420, 520 and the preferred refrigerant compositions 430, 530 in FIGS. 10 and 11 would include those compositions with the desired temperature glide.

In an embodiment, a desired set of properties of a refrigerant composition includes being stable and having a capacity that is at or about or greater than 85% of the capacity of R32. Based on thmay be desired properties, useful refrigerant compositions may be determined based on the useful refrigerant compositions 460 of FIG. 12 and the useful refrigerant compositions 560 of FIG. 11.

The useful refrigerant compositions 460 in FIG. 12 include less than 38% R1234yf and greater than 0% of R1234yf; at or about 37.6 wt % (80 wt % of R32 in mixture×47 wt % of mixture in composition), or greater than 37.6 wt % and less than 80 wt % of R32; at or about 9.4 wt % (20 wt % of R1123 in mixture×47% of mixture in composition), or greater than 9.4 wt % and less than 20 wt % of R1123; and at or about 52 wt %, or less than at about 52 wt % and greater than 0 wt % of $CF_3I$.

The useful refrigerant compositions 560 in FIG. 13 include less than 32% R1234yf and greater than 0% of R1234yf; at or about 12.2 wt % (20 wt % of R32 in mixture×61% of mixture in composition), or greater than 12.2 wt % and less than 80 wt % of R32; at or 48.8 wt % (80 wt % of R1123 in mixture×61 wt % of mixture in composition), or greater than 48.8 wt % and less than 80 wt % of R1123; and at or about 39 wt %, or less than at about 39 wt % and greater than 0 wt % of $CF_3I$.

Accordingly, based on the ranges of each useful refrigerant compositions 460, 560, useful refrigerant compositions may include less than 38% R1234yf and greater than 0% of R1234yf; from at or about 12.2 wt % to at or about 37.6 wt % of R32; from at or about 9.4 wt % to at or about 48.8 wt % of R1123; and at or about 52 wt %, or less than at about 52 wt % and greater than 0 wt % of $CF_3I$.

In an embodiment, a desired set of properties of a refrigerant composition includes being stable, being nonflammable, and having a capacity that is at or about or greater than 85% of the capacity of R410A. In an embodiment, the useful compositions 460 in FIG. 12 may include preferred refrigerant compositions 470 that are nonflammable and the useful refrigerant compositions 560 in FIG. 13 may include preferred refrigerant compositions 570 that are nonflammable. Based on thmay be desired properties, preferred refrigerant compositions may be determined based on the preferred refrigerant compositions 470 of FIG. 12 and the preferred refrigerant compositions 570 of FIG. 13.

The preferred refrigerant compositions 470 of FIG. 12 include at or about 17 wt %, or less than 17 wt % and greater than 0% of R1234yf; at or about 37.6 wt % (80 wt % of R32 in mixture×47 wt % of mixture in composition) to at or about 53.6 wt % (80 wt % of R32 in mixture×67 wt % of mixture in composition) of R32; at or about 9.4 wt % (20 wt % of R1123 in mixture×47 wt % of mixture in composition) to at or about 13.4 wt % (20 wt % of R1123 in mixture×67 wt % of mixture in composition) of R1123; and at or about 31 wt % to at or about 53 wt % of $CF_3I$.

The preferred refrigerant compositions 570 in FIG. 13 include at or about 7 wt %, or less than 7 wt % of R1234yf and greater than 0 wt % of R1234yf; from at or about 12.2 wt % (20 wt % of R32 in mixture×61 wt % of mixture in composition) to at or about 13.4 wt % (20 wt % of R32 in mixture×67 wt % of mixture in composition) of R32; from at or about 48.8 wt % (80 wt % of R1123 in mixture×61 wt % of mixture in composition) to at or about 53.6 wt % (80 wt % of R1123 in mixture×67% of mixture in composition) of R1123; and at or about 32 wt % to at or about 39 wt % of $CF_3I$.

Accordingly, based on the ranges of each preferred refrigerant compositions 470, 570, refrigerant compositions include at or about 17 wt %, or less than 17 wt % and greater than 0 wt % of R1234yf; from at or about 12.2 wt % to at or about 53.6 wt % of R32; at or about 9.4 wt % to at or about 53.6 wt % of R1123; and at or about 31 wt % to at or about 53 wt % of $CF_3I$.

In an embodiment, the set of desired properties may include a specific GWP. In an embodiment, a composition having a GWP of at or about or less than 400 may be desired. In an embodiment, a composition having a GWP of at or about or less than 300 may be desired. In an embodiment, a composition having a GWP of at or about or less than 150 may be desired. In an embodiment, a composition having a GWP of at or about 150 to at or about 300 may be desired. In such embodiments, the useful refrigerant compositions 460, 560 and the preferred refrigerant compositions 470, 570 in FIGS. 12 and 13 would include those compositions with the desired GWP.

In an embodiment, the desired property of the capacity being equal or greater than 85% of the capacity of R32 may be different. In an embodiment, a composition having a capacity at or about or greater than 90% of the capacity of R410A may be desired. In an embodiment, a composition having a capacity at or about or greater than 95% of the capacity of R10 may be desired. In such embodiments, the useful refrigerant compositions 460, 560 and the preferred refrigerant compositions 470, 570 in FIGS. 12 and 13 would include those compositions with the desired capacity.

In an embodiment, the set of desired properties may include a specific temperature glide. In an embodiment, a composition having a temperature glide at or about or less than 15° F. may be desired. In an embodiment, a composition having a temperature glide at or about or less than 12° F. may be desired. In an embodiment, a composition having a temperature glide at or about or less than 10° F. may be desired. In an embodiment, a composition having a temperature glide at or about or less than 5° F. may be desired. In such embodiments, the useful refrigerant compositions 470, 570 and the preferred refrigerant compositions 470, 570 in FIGS. 12 and 13 would include those compositions with the desired temperature glide.

It should be noted that the described refrigerant compositions may include one or more additional components. For example, additional components may be impurities, lubricant, and refrigeration system additives, tracers, and an ultraviolet ("UV") dye and solubilizing agent. Typically, a refrigerant composition may include less than 1 wt % of these additional components. Some refrigerant compositions, depending upon their components, may have less at or about or less than 5 wt % of some additives, such as lubricants, in a particular location or piece of equipment in a heat transfer circuit. In an embodiment, the refrigerant compositions described would have the ranges described above and the additive would be added in addition to the composition.

In an embodiment, a refrigerant composition may include one or more impurities. An impurity may be, for example, a refrigerant or refrigerant blend used in an HVACR system. An impurity may be, for example, refrigeration lubricants, particulates (e.g., metal particles, metal salts, elastomer particles) from equipment of the HVACR system, and other contaminant that may adversely affect a working fluid.

In an embodiment, a refrigerant composition may include one or more lubricants that are compatible with the refrigerant composition. For example, a lubricant may be a lubricant that is designed for use with R1123, R32, $CF_3I$, and 1234yf and is compatible with refrigerant compositions described herein. Further, the lubricant may be based on the HVACR system that will be using the refrigerant composition. For example, a lubricant may be selected based on the equipment of the HVACR system (e.g., compressor 2 in FIG. 1) and the environment in which the refrigerant may be exposed to. A refrigerant composition may include those lubricants known as "mineral oils" and/or those lubricants known as "synthetic oils" in the field of compression refrigeration lubrication.

In an embodiment, a refrigerant composition may include one or more refrigeration system additives to, for example, enhance lubricity and/or system stability. A refrigeration system additive may be, for example, an anti-wear agent, an extreme pressure lubricant, a corrosion or oxidation inhibitor, a metal surface deactivator, a stabilizer (e.g., antioxidant, free radial scavenger, water scavenger), a foaming and antifoam control agent, or a leak detectant.

In an embodiment, a refrigerant composition may include one or more tracers. The tracers may be used in detecting if any dilution, contamination, or other alteration of the working fluid (which includes the refrigerant composition) has occurred. In an embodiment, a refrigerant composition may include one or more UV dyes. The UV dye may allow a person (e.g., operator, field technician) to observe leaks in or near the HVACR system. Due to the low solubility of some UV dyes in some refrigerant compositions, a solubilizing agent may be included with the UV dye.

In an embodiment, a refrigerant composition in a HVACR system may be retrofitted. The refrigerant composition is retrofitted to have a desired set of properties. The refrigerant composition is retrofitted so as to result in a retrofitted refrigerant composition that includes R1123, R32, and $CF_3I$. The retrofitted composition may also include R1234yf. For example, the refrigerant composition to be retrofitted in an embodiment includes R32 or a mixture of R32 and $CF_3I$.

In an embodiment, an HVACR utilizes an existing refrigerant composition including R32 and/or R1123, and a method of retrofitting the refrigerant composition of the HVACR includes adding an amount of one or more of R1123, and adding an amount of $CF_3I$, and adding an amount of R32 to the existing refrigerant composition. The amounts of the one or more refrigerants added results in a retrofitted refrigerant composition with a desired set of properties. In an embodiment, an HVACR utilizes an existing refrigerant composition including R32and/or R1123, and a method of retrofitting the refrigerant composition of the HVACR includes adding one or more of an amount of a R1123, an amount of R1234yf, and an amount of a $CF_3I$. The amounts of the one or more refrigerants added results in a retrofitted refrigerant composition with the desired set of properties.

In an embodiment where the HVACR system is designed to utilize a refrigerant composition similar to R410A, retrofitted compositions with the desired properties can be determined using the matrixes of FIGS. 2-4 and 7-11. In an embodiment where the HVACR system is designed to utilize a refrigerant composition similar to R32, retrofitted compositions that would have the desired set of properties can be determined using the matrixes of FIGS. 2, 5, 6, 8, 9, 12, and 13.

In an embodiment, a method for making a refrigerant composition for a HVACR system includes mixing an amount of R1123, an amount of R32, and an amount of $CF_3I$. The amounts of R1123, R32, and $CF_3I$ may be selected so that the refrigerant composition has one or more desired properties. A desired property may be, for example, flammability, GWP, temperature glide, a coefficient of performance, compressor discharge ratio, mass flow rate, or fluid density. In an embodiment, one or more matrixes in FIGS. 2-7D are utilized so that the refrigerant composition has the one or more desired properties.

In an embodiment, the method may include selecting an appropriate amount of one or more additional components (e.g., lubricant, and refrigeration system additives, tracers, an ultraviolet dye, a solubilizing agent).

Aspects:

Any of aspects 1-11 can be combined with any of aspects 12-20 and any of aspects 12 -16 can be combined with any of aspects 17-20.

Aspect 1. A refrigerant composition for an HVACR system comprising:
R1123 refrigerant;
R32 refrigerant; and
$CF_3I$, wherein
the refrigerant composition has a capacity that is about or greater than 85% of a capacity of R410A refrigerant.

Aspect 2. The refrigerant composition of aspect 1, wherein the refrigerant composition has a capacity that is about or greater than 90% of the capacity of R410A refrigerant.

Aspect 3. The refrigerant composition of aspects 1 or 2, wherein the refrigerant composition has a temperature glide of about or less than 10° F.

Aspect 4. The refrigerant composition of any of aspects 1-3, wherein the refrigerant composition has a GWP of about or less than 300.

Aspect 5. The refrigerant composition of any of aspects 1-4, wherein the refrigerant composition is a nonflammable composition.

Aspect 6. The refrigerant composition of any of aspects 1-5, wherein a ratio of the R1123 refrigerant to the R32 refrigerant (R1123:R32) by weight in refrigerant composition is from at or about 60:40 to at or about 40:60.

Aspect 7. The refrigerant composition of any of aspects 1 or 3-6, wherein the refrigerant composition has a capacity that is about or greater than 85% of a capacity of R32 refrigerant alone.

Aspect 8. The refrigerant composition of any of aspects 1 or 3-7, wherein the refrigerant composition has a capacity that is about or greater than 90% of the capacity of R32 refrigerant alone.

Aspect 9. The refrigerant composition of any of aspects 1-8, wherein the refrigerant composition has a temperature glide of about or less than 10° F.

Aspect 10. The refrigerant composition of any of aspects 1-9, wherein the refrigerant composition has a GWP of about or less than 300.

Aspect 11. The refrigerant composition of any of aspects 1-10, wherein the refrigerant composition is a nonflammable composition.

Aspect 12. A method of making a refrigerant composition for a HVACR system, the method including:
mixing an amount of R1123, an amount of R32, and an amount of $CF_3I$, wherein
the refrigerant composition has a capacity that is about or greater than 85% of a capacity of R410A refrigerant.

Aspect 13. The method of aspect 12, wherein the refrigerant composition has a capacity that is about or greater than 85% of a capacity of R32 refrigerant alone.

Aspect 14. The method of aspects 12 or 13, wherein a GWP of the refrigerant composition is less than 300.

Aspect 15. The method of any of aspects 12-14, wherein the refrigerant composition is a nonflammable refrigerant composition.

Aspect 16. The method of any of aspects 12-15, wherein the refrigerant composition has a temperature glide of about or less than 10° F.

Aspect 17. A method of retrofitting a refrigerant composition in an HVACR system, comprising:
adding one or more of an amount of R1123 refrigerant, an amount of R32 refrigerant, and an amount of $CF_3I$ to an existing refrigerant composition to produce a retrofitted refrigerant composition, the retrofitted refrigerant comprising the R1123 refrigerant, the R32 refrigerant, and the $CF_3I$, wherein
the refrigerant composition comprises at least one of R32 refrigerant and R1123 refrigerant, and the retrofitted refrigerant composition has a capacity that is about or greater than 85% of a capacity of R410A.

Aspect 18. The method of aspect 17, wherein the GWP of the retrofitted refrigerant composition is less than 300.

Aspect 19. The method of aspect 17 or 18, wherein the retrofitted refrigerant composition is a nonflammable refrigerant composition.

Aspect 20. The method of any of aspects claim 17-19, wherein the retrofitted refrigerant composition has a temperature glide of about or less than 10° F.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A refrigerant composition for an HVACR system having a refrigerant portion consisting of:
R1123 refrigerant;
R32 refrigerant; and
from at or about 32 wt % to at or about 65 wt % of $CF_3I$, wherein the refrigerant portion is nonflammable, has a capacity that is about or greater than 85% of a capacity of R410A refrigerant, and has a GWP of about or less than 300, and the refrigerant composition optionally includes one or more impurities, lubricants, refrigeration systems additives, tracers, ultraviolet dyes, and solubilizing agents.

2. The refrigerant composition of claim 1, wherein the refrigerant portion has a capacity that is about or greater than 90% of the capacity of R410A refrigerant.

3. The refrigerant composition of claim 1, wherein the refrigerant portion has a temperature glide of about or less than 10° F.

4. The refrigerant composition of claim 1, wherein a ratio of the R1123 refrigerant to the R32 refrigerant (R1123:R32) by weight in the refrigerant portion is from at or about 60:40 to at or about 40:60.

5. The refrigerant composition of claim 1, wherein the refrigerant portion has a capacity that is about or greater than 85% of a capacity of R32 refrigerant alone.

6. The refrigerant composition of claim 5, wherein the refrigerant portion has a capacity that is about or greater than 90% of a capacity of R32 refrigerant alone.

7. The refrigerant composition of claim 5, wherein the refrigerant portion has a temperature glide of about or less than 10° F.

8. A method of making a refrigerant composition for a HVACR system, the method including:

mixing an amount of R1123 refrigerant, an amount of R32 refrigerant, and an amount of $CF_3I$, wherein the refrigerant composition has a refrigerant portion consisting of the R1123 refrigerant, the R32 refrigerant, and from at or about 32 wt % to at or about 65 wt % of the $CF_3I$, the refrigerant portion is nonflammable, has a capacity that is about or greater than 85% of a capacity of R410A refrigerant, and has a GWP of about or less than 300, and the refrigerant composition optionally includes one or more impurities, lubricants, refrigeration systems additives, tracers, ultraviolet dyes, and solubilizing agents.

9. The method of claim 8, wherein the refrigerant portion has a capacity that is about or greater than 85% of a capacity of R32 refrigerant alone.

10. The method of claim 8, wherein the refrigerant portion has a temperature glide of about or less than 10° F.

11. A method of retrofitting a refrigerant composition in an HVACR system, comprising:

adding one or more of an amount of R1123 refrigerant, an amount of R32 refrigerant, and an amount of $CF_3I$ to an existing refrigerant composition to produce a retrofitted refrigerant composition, the retrofitted refrigerant having a refrigerant portion consisting of the R1123 refrigerant, the R32 refrigerant, and from at or about 32 wt % to at or about 65 wt % of the $CF_3I$, wherein the existing refrigerant composition comprises at least one of R32 refrigerant and R1123 refrigerant, the refrigerant portion is nonflammable, has a capacity that is about or greater than 85% of a capacity of R410A, and has a GWP of about or less than 300, and the retrofitted refrigerant composition optionally includes one or more impurities, lubricants, refrigeration systems additives, tracers, ultraviolet dyes, and solubilizing agents.

12. The method of claim 11, wherein the refrigerant portion has a temperature glide of about or less than 10° F.

* * * * *